(12) United States Patent
Gamble, II et al.

(10) Patent No.: US 8,262,004 B2
(45) Date of Patent: Sep. 11, 2012

(54) HOPPER SPREADER/SPRAYER APPARATUS

(75) Inventors: Robert N. Gamble, II, Watertown, WI (US); Lynn W. Schultz, Campbellsport, WI (US); Terry C. Wendorff, Slinger, WI (US)

(73) Assignee: Sno-Way International, Inc., Hartford, WI (US)

( * ) Notice: Subject to any disclaimer, the term of this patent is extended or adjusted under 35 U.S.C. 154(b) by 533 days.

(21) Appl. No.: 11/444,176

(22) Filed: May 31, 2006

(65) Prior Publication Data

US 2006/0266853 A1    Nov. 30, 2006

Related U.S. Application Data

(60) Provisional application No. 60/686,019, filed on May 31, 2005.

(51) Int. Cl.
*A01C 17/00* (2006.01)

(52) U.S. Cl. ........ 239/681; 239/689; 239/172; 239/176; 239/666

(58) Field of Classification Search .............. 239/661, 239/663, 681, 650, 172, 175, 689, 666
See application file for complete search history.

(56) References Cited

U.S. PATENT DOCUMENTS

| | | | |
|---|---|---|---|
| 2,316,116 A * | 4/1943 | Thompson et al. | 220/564 |
| 2,773,626 A | 12/1956 | Gandrud | |
| 3,615,055 A * | 10/1971 | van der Lely et al. | 239/665 |
| 3,703,260 A | 11/1972 | Grabske | |
| 3,705,387 A * | 12/1972 | Stern et al. | 446/460 |
| 3,760,933 A | 9/1973 | Maldeis et al. | |
| 3,767,126 A * | 10/1973 | Van Der Lely | 239/661 |
| 3,790,090 A | 2/1974 | Lorenc et al. | |
| 4,106,703 A | 8/1978 | Magda | |
| 4,212,428 A * | 7/1980 | Walker | 239/677 |
| 4,381,699 A | 5/1983 | Haussler | |
| 4,588,113 A | 5/1986 | Egerdahl | |
| 4,688,819 A * | 8/1987 | Reilly et al. | 172/439 |
| 4,712,717 A | 12/1987 | Egerdahl | |
| 4,798,325 A * | 1/1989 | Block | 239/663 |

(Continued)

FOREIGN PATENT DOCUMENTS

EP    00300580    1/1989

OTHER PUBLICATIONS

"Electrically Adjustable Proportional Pressure Compensated Flow Control" Brand Hydraulics, Specification Sheet, one page, Aug. 23, 1999.

(Continued)

*Primary Examiner* — Jason J Boeckmann
*Assistant Examiner* — Trevor E McGraw
(74) *Attorney, Agent, or Firm* — Reinhart Boerner Van Deuren S.C.

(57) ABSTRACT

A hopper spreader apparatus adapted for mounting to a vehicle, to be towed by a vehicle or to be pushed by hand, includes a sprayer apparatus for spraying liquid material as well as dispensing dry free-flow material. The hopper spreader apparatus includes a variable discharge mechanism, allowing adjustment of both the flow rate and the distribution pattern of the dry free-flow material particulate material being dispensed. The operation of the hopper spreader apparatus can be controlled remotely using radio frequency (RF) signaling. The hopper spreader apparatus obtains electrical power from an on-board battery and includes a battery charger to allow the battery to be charged when the hopper spreader apparatus is not in use.

28 Claims, 21 Drawing Sheets

U.S. PATENT DOCUMENTS

| | | | |
|---|---|---|---|
| 4,809,449 A | | 3/1989 | Solaja |
| 4,867,381 A | | 9/1989 | Speicher |
| 4,955,538 A | * | 9/1990 | Laube et al. ............... 239/1 |
| 5,096,125 A | | 3/1992 | Wise et al. |
| 5,333,795 A | * | 8/1994 | Jessen ................... 239/663 |
| 5,375,773 A | | 12/1994 | Lewis |
| 5,524,368 A | * | 6/1996 | Struck et al. ............... 37/235 |
| 5,528,216 A | | 6/1996 | Main |
| 5,692,875 A | | 12/1997 | Boman |
| 5,755,387 A | | 5/1998 | Hedrick |
| 5,860,604 A | * | 1/1999 | Kooiker ................... 239/684 |
| 5,947,391 A | | 9/1999 | Beck et al. |
| 5,988,534 A | | 11/1999 | Kost et al. |
| 6,035,944 A | | 3/2000 | Neuner et al. |
| 6,089,478 A | | 7/2000 | Truan et al. |
| 6,149,079 A | * | 11/2000 | Kinkead et al. ............ 239/668 |
| 6,173,904 B1 | | 1/2001 | Doherty et al. |
| 6,220,531 B1 | * | 4/2001 | Pierce et al. ............... 239/672 |
| 6,220,532 B1 | | 4/2001 | Manon et al. |
| 6,382,330 B2 | | 5/2002 | Bischel et al. |
| 6,408,900 B1 | | 6/2002 | Burian et al. |
| 6,508,419 B1 | * | 1/2003 | Kinkead et al. ............ 239/668 |
| 6,533,198 B1 | * | 3/2003 | Podevels et al. ............ 239/676 |
| 6,656,012 B1 | * | 12/2003 | DeAngelis et al. ............ 446/454 |
| 6,702,208 B1 | | 3/2004 | Hadler et al. |
| 6,715,696 B2 | * | 4/2004 | Pierce ................... 239/172 |
| 6,938,829 B2 | * | 9/2005 | Doherty et al. ............... 239/1 |
| 7,063,280 B1 | * | 6/2006 | Bogart et al. ............... 239/687 |
| 2005/0189444 A1 | * | 9/2005 | Kost ................... 239/661 |
| 2006/0054722 A1 | * | 3/2006 | Jones ................... 239/663 |
| 2006/0180680 A1 | | 8/2006 | Gamble |
| 2006/0214391 A1 | * | 9/2006 | Columbia ................... 280/491.5 |

OTHER PUBLICATIONS

"Full Range Flow Control, F-C Series", Brand Hydraulics, Specification Sheet, one page, prior to Aug. 29, 2001.

Internet Document: Product Catalog, Brand Hydraulics, website http: www.brandhyd.com/fchigh/hchigh-iunfo.htm (Oct. 25, 2001), three pages.

"Spreadator", Sno-Way International, Inc. Sales Brochure, 2001.

* cited by examiner

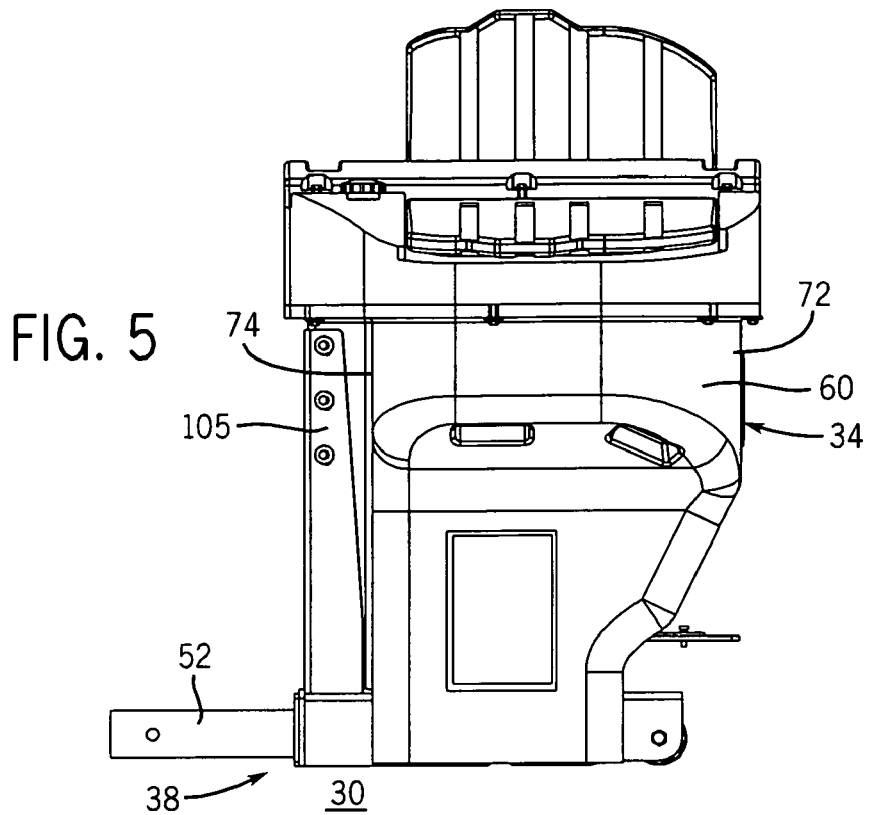
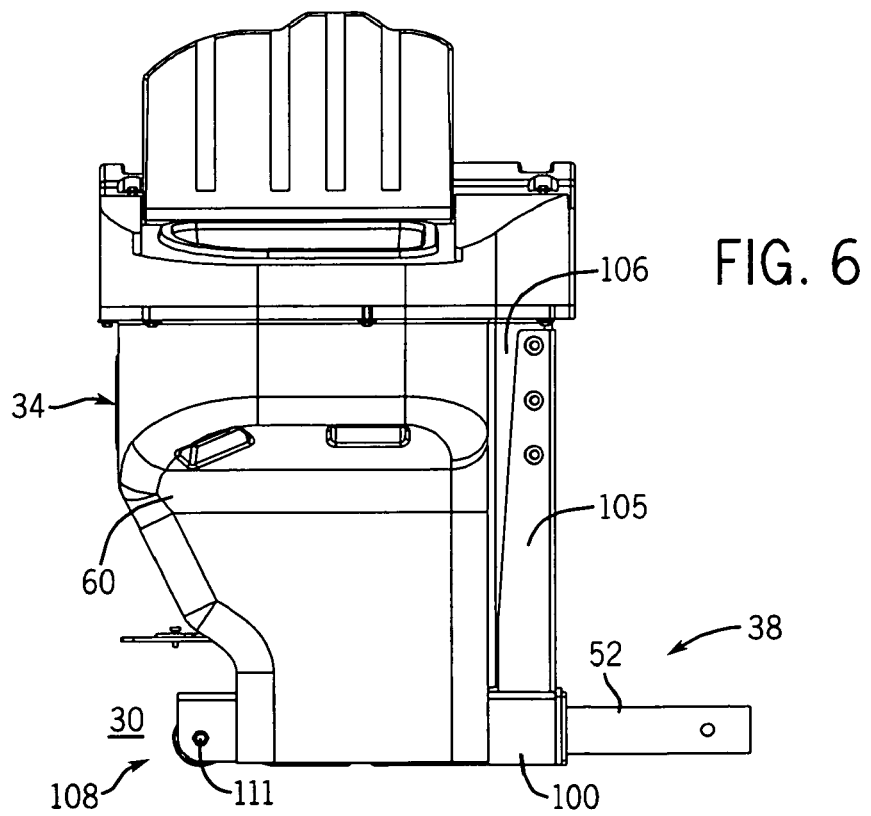

HOPPER SPREADER/SPRAYER APPARATUS

CROSS REFERENCE TO RELATED APPLICATION

This application is claims priority benefit from provisional application Ser. No. 60/686,019, which was filed on May 31, 2005, which application is incorporated herein by reference.

BACKGROUND OF THE INVENTION

Field of the Invention

This invention relates to hopper spreader apparatus for spreading dry, free flow materials, and more particularly, to a versatile hopper spreader apparatus including a hopper spreader unit that is adapted to be mounted to a vehicle, towed by a vehicle or pushed by hand, and which can include a sprayer apparatus for spraying liquid material.

The spreading of salt and/or sand is a requirement in many areas for maintaining roads and driveways during the winter months. Various types of spreader units have been developed for spreading dry, free flow materials, such as salt and sand, for example. Some spreader units are permanently mounted on a vehicle. Other ones of these spreader units have been designed to be removably mounted on vehicles, such as pickup trucks, because of the availability of pick-up trucks to those who are involved in road and driveway maintenance.

One known type of spreader unit includes a hopper having a discharge outlet near the bottom of the hopper through which the particulate material, such as salt, falls onto a spinner. The spinner that is spun by a drive assembly for spreading the particulate material discharged from the hopper over a wide distribution area.

By rotating the spinner as the particulate material is being delivered to the spinner, the particulate material is centrifugally propelled by the spinner in a wide pattern onto the ground surface on which the vehicle is moving. Typically, the spinner is mounted on a drive shaft that is rotated by a motor, the speed of which is controllable by the driver of the vehicle to change the area over which the particulate material is distributed.

Generally, it is desirable to adjust the volume and/or the distribution pattern for the material being discharged out of the hopper. Accordingly, some spreader units include a flow rate adjustment mechanism provided by controlling an outlet orifice located in the discharge outlet of the hopper, as is known. In addition, flow path adjustment plates can be mounted adjacent to the spinner to provide width and/or range adjustment. Typically, the flow rate adjustment mechanism is a one-piece unit having a handle or lever that has a knife edge that can be positioned to adjust the flow rate of particulate matter to the spinner. In known flow control gating arrangements, the outlet of the flow control gating is located at the periphery of the spinner at the back of the hopper. While known flow control gating arrangements allow adjustment in the flow rate, they do not permit changing the direction of flow because the location of the outlet of the flow control gating, i.e., the point at which the material is delivered to the spinner, is fixed. Moreover, it is difficult for an operator to know the setting of the flow gate (i.e., the size of the outlet orifice) and thus how much material will be discharged out of the hopper.

In some applications, there is a need to dispense liquids using a spraying apparatus as well as distributing dry free flow material. Such applications can include dust control, or dispensing of pesticides, herbicides, liquid salt, and liquid deicers, for example. In such applications, two separate unit are needed, one unit for dispensing dry material and a second unit for dispensing liquid material. This results in increased cost to the user as well as the need to separately store and maintain the two separate units.

It is accordingly the primary objective of the present invention that it provide an improved hopper spreader apparatus for dispensing dry, free flow material.

It is another objective of the present invention that it provide a variable discharge mechanism for a hopper spreader apparatus that allows adjustment of both the flow rate and the distribution pattern of free flow material particulate material being discharged from the hopper spreader apparatus.

Another objective of the present invention is that it provide an improved hopper spreader apparatus that can be mounted on a vehicle, towed by the vehicle, or pushed by hand, for dispensing dry, free flow material.

A further objective of the present invention is that it provide an improved hopper spreader apparatus for dispensing dry, free flow material and/or liquid material.

It is yet another objective of the present invention that it provide an improved hopper spreader apparatus for dispensing dry, free flow material and/or liquid material and that can be mounted on a vehicle, towed by the vehicle, or pushed by hand.

The hopper spreader apparatus of the present invention must also be of construction which is both durable and long lasting, and it should also require little or no maintenance to be provided by the user throughout its operating lifetime. In order to enhance the market appeal of the hopper spreader apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention which provides a versatile hopper spreader apparatus that is adapted for mounting to a vehicle or to be towed by the vehicle, or pushed by hand, and that can include a sprayer apparatus for spraying liquid material as well as dry free-flow material.

In accordance with the invention, there is provided a hopper spreader apparatus comprising a hopper for containing dry, free flow material to be dispensed, the hopper having a discharge outlet for dispensing the material; a spinner located adjacent to the discharge outlet for receiving free flow material discharged from the hopper and spreading the material over a distribution area; a liquid storage tank; a liquid distribution device; and a flow control apparatus coupling the liquid distribution device to the liquid storage tank, the flow control apparatus operable to allow liquid from the liquid storage tank to be dispensed in a spray pattern defined by the liquid distribution device.

Further in accordance with the invention, there is provided a hopper spreader apparatus for use with a vehicle. The hopper spreader apparatus comprises a hopper for containing dry, free flow material to be dispensed, the hopper having a discharge outlet for dispensing the material; a spinner located adjacent to the discharge outlet for receiving free flow material discharged from the hopper and spreading the material over a large distribution area; a coupling mechanism for coupling the hopper to the vehicle; a liquid storage tank; a liquid distribution device; and a flow control apparatus coupling the liquid distribution device to the liquid storage tank, the flow control apparatus operable to allow liquid from the liquid storage tank to be dispensed in a spray pattern defined by the liquid distribution device.

Further in accordance with the invention, there is provided a portable hopper spreader apparatus adapted to be pushed by hand by a user. The hopper spreader apparatus comprises a hopper for containing the dry, free flow material, the hopper having a discharge outlet for dispensing the material; a spinner located adjacent to the discharge outlet for receiving free flow material discharged from the hopper and spreading the material over a large distribution area; a liquid storage tank; a liquid distribution device; a flow control apparatus coupling the liquid distribution device to the liquid storage tank, the flow control apparatus operable to allow liquid from the liquid storage tank to be dispensed in a spray pattern defined by the liquid distribution device; and a set of wheels mounted on the bottom on the hopper for supporting the hopper spreader apparatus on a surface, allowing the hopper spreader apparatus to be pushed manually along the surface by a user.

Further in accordance with the invention, there is provided a combined hopper spreader/sprayer apparatus for dispensing dry, free flow material and liquid material. The hopper spreader/sprayer apparatus comprises a hopper spreader apparatus including a hopper for containing the dry, free flow material, the hopper having a discharge outlet for dispensing the material; a spinner located adjacent to the discharge outlet for receiving free flow material discharged from the hopper and spreading the material over a large distribution area; and a discharge mechanism interposed between the discharge outlet and the spinner; a sprayer apparatus including a liquid storage tank incorporated into the hopper; a liquid distribution device, and a flow control apparatus coupling the liquid distribution device to the liquid storage tank, the flow control apparatus operable to allow liquid from the tank to be dispensed in a spray pattern defined by the liquid distribution device; and a set of wheels adapted to be removably installed on the hopper for supporting the hopper spreader apparatus on a surface, allowing the hopper spreader/sprayer apparatus to be moved by a vehicle or pushed manually along the surface when the set of wheels is installed on the hopper.

The operation of the hopper spreader apparatus can be controlled remotely using a hard-wired controller or alternatively, by a controller that incorporates radio frequency (RF) signaling. Moreover, the hopper spreader apparatus can obtain electrical power from an on-board battery and can include a battery charger to allow the battery to be charged when the hopper spreader apparatus is not in use.

It may therefore be seen that the present invention provides a versatile hopper spreader apparatus that is adapted to be mounted to a vehicle, towed by a vehicle or pushed by hand, and that can include a sprayer apparatus for spraying liquid material as well as dry free-flow material. The hopper spreader apparatus includes a variable discharge mechanism that allows varying the discharge rate by adjusting the size of a delivery opening and thus the discharge volume flow rate to a spinner located beneath the discharge outlet of the hopper. In addition, the delivery opening is located with respect to the spinner to optimize the distribution pattern for the material being spread.

The hopper spreader apparatus of the present invention is of a construction which is both durable and long lasting, and which will require little or no maintenance to be provided by the user throughout its operating lifetime. The hopper spreader apparatus of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 5 is a left side view of the hopper spreader apparatus of FIG. 3;

FIG. 6 is a right side view of the hopper spreader apparatus of FIG. 3;

In the following detailed description of the hopper spreader apparatus, the term "front" refers to the portion of the hopper spreader apparatus that includes the discharge outlet and the spinner, and the term "rear" refers to the portion of the hopper spreader apparatus that includes the hitch adapter or hitch ball coupler for mounting the hopper spreader apparatus to the rear of the vehicle. Also, the terms "left" and "right" are taken as viewed toward the vehicle from the rear in FIG. 1.

DETAILED DESCRIPTION OF THE PREFERRED EMBODIMENT

Referring to FIGS. 1 and 3-6 of the drawings, there is shown a hopper spreader apparatus 30 in accordance with the present invention. By way of example, the hopper spreader apparatus 30 is described with reference to an application for spreading dry, free flow material, such as salt, sand and the like, onto a surface being traveled by a vehicle 32 to which the hopper spreader apparatus 30 is mounted.

Figure 16:
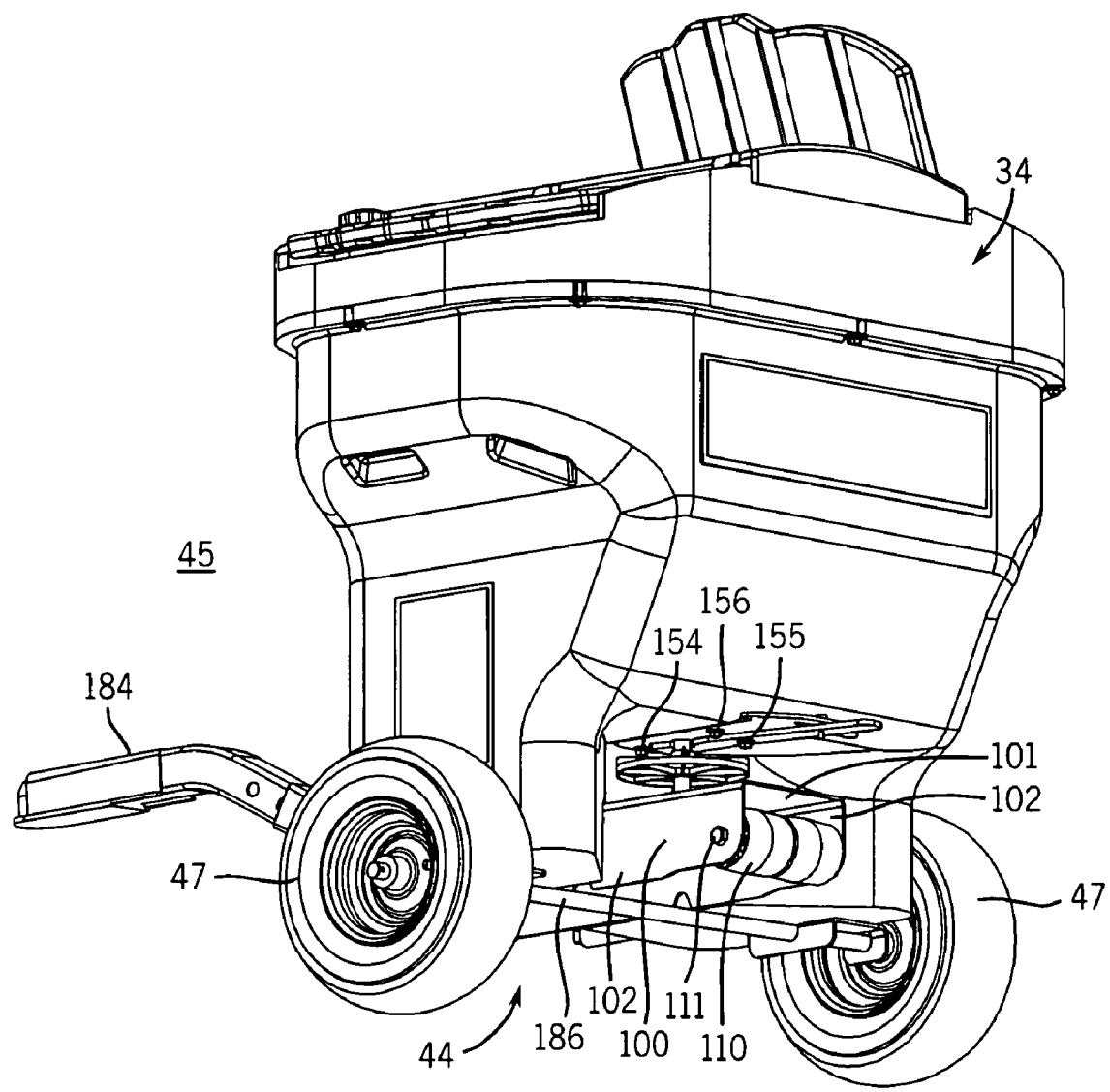
FIG. 16 is a front perspective view of a hopper spreader apparatus including the hopper spreader unit of the hopper spreader apparatus of FIG. 3 and which is adapted to include a wheel assembly.
Figure 17:
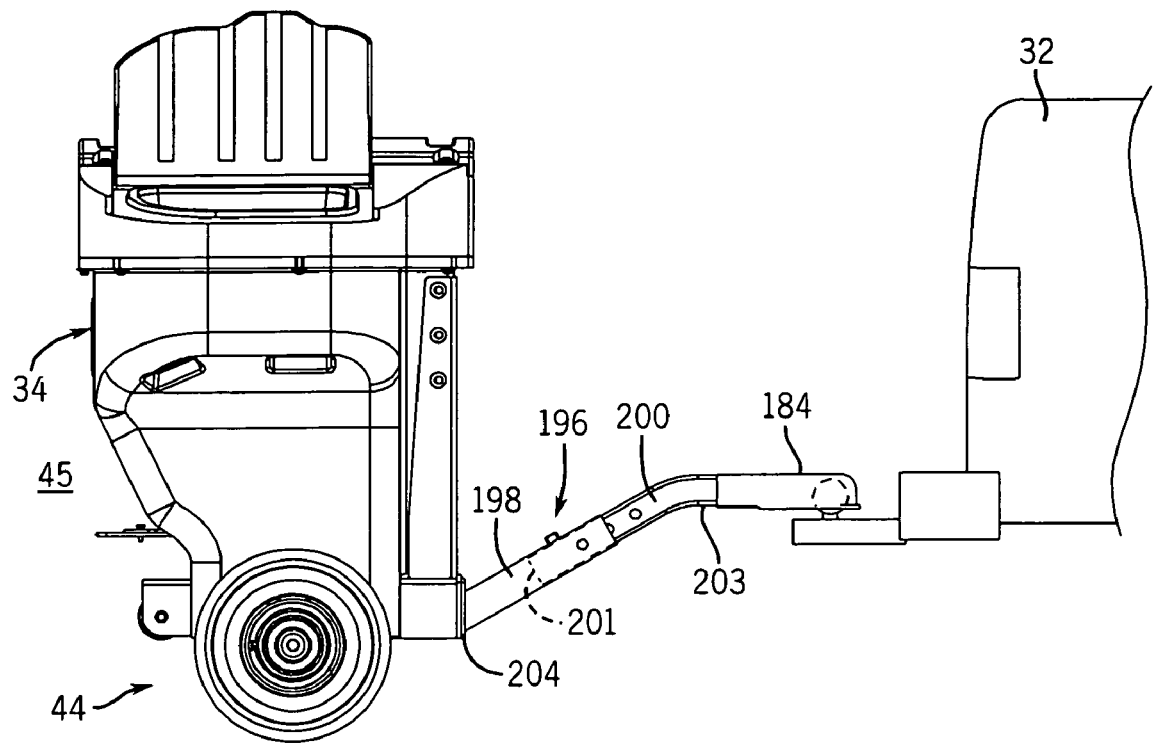
FIG. 17 is a view illustrating the hopper spreader apparatus of FIG. 16 being towed by a vehicle in accordance with the present invention.

The hopper spreader apparatus 30 includes a basic hopper spreader unit 34 and a mounting assembly 36 having a hitch adapter 38 that facilitates removable mounting of the hopper spreader unit 34 to the vehicle 32, using the trailer hitch 40 of the vehicle 32. In accordance with the invention, the hopper spreader unit 34 is a versatile unit that is adapted to be mounted to a vehicle or towed by a vehicle, and which can include a sprayer apparatus for spraying liquid material. By way of example, the basic hopper spreader unit 34 can be adapted to include a wheel assembly 44, providing a hopper spreader apparatus 45, shown in FIGS. 16 and 17, for example, that can be towed by the vehicle as shown in FIG. 17. Moreover, the basic hopper spreader unit 34 can be adapted to include a sprayer apparatus 46 including a liquid distribution device, such as a spray wand 48, providing a hopper spreader/sprayer apparatus 50, shown in FIGS. 26-27, for distributing liquid materials as well as dry free-flow material. The liquid can be water or other liquid, dispensed for dust control. Additionally, the spreader/sprayer can be used for dispensing pesticides, herbicides, liquid salt, and liquid deicers, for example.

Figure 1:
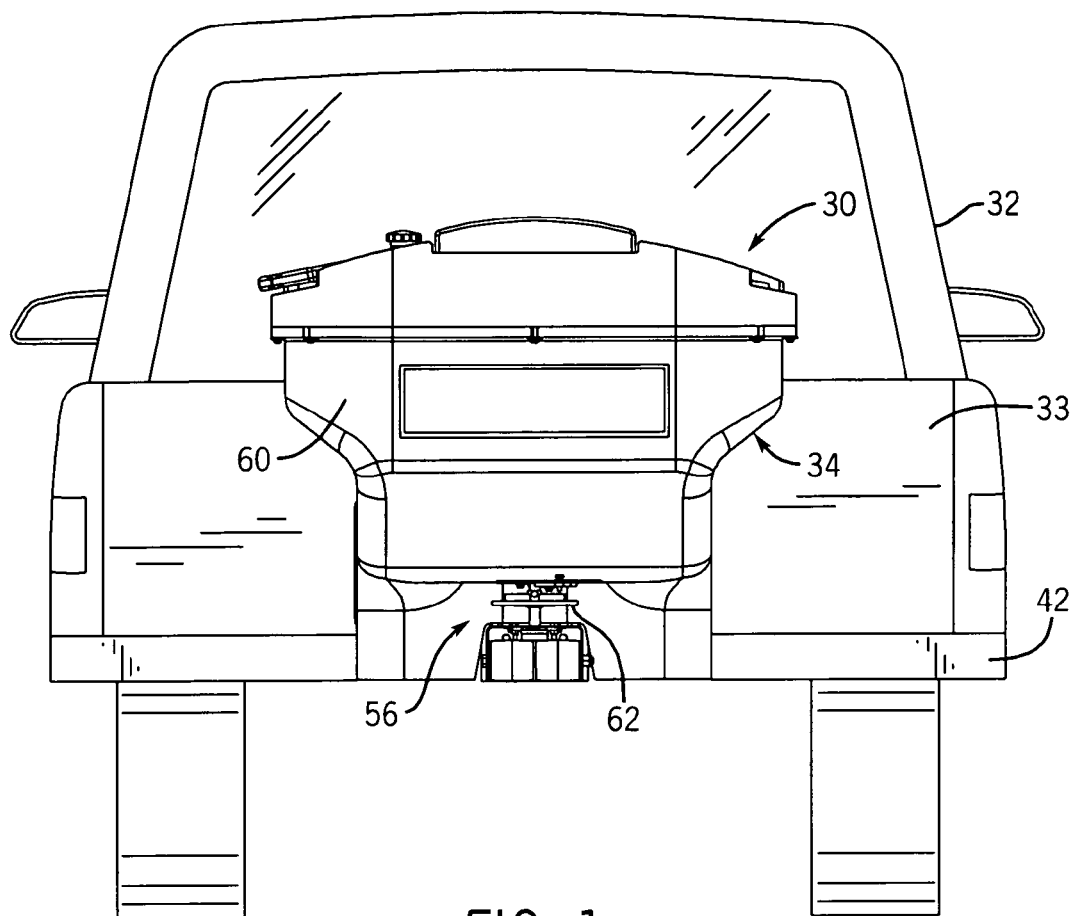
FIG. 1 is a view illustrating a hopper spreader apparatus provided in accordance with the invention shown mounted to the rear of a vehicle.
Figure 2:
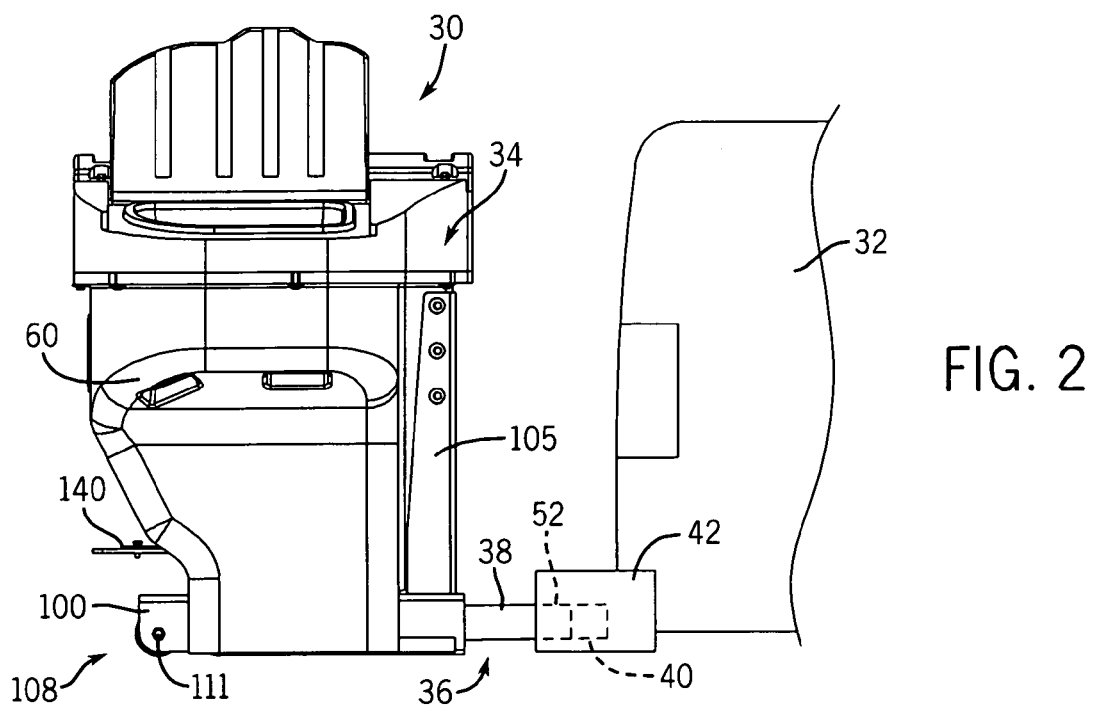
FIG. 2 is a side elevation view of a portion of the hopper spreader apparatus of FIG. 1.

Referring to FIGS. 1 and 2, the hopper spreader apparatus 30 is adapted for mounting to a vehicle 32, such as a pickup truck, a jeep, and the like, that has a conventional trailer hitch 40 located at the rear of the vehicle. Such trailer hitches commonly are located below and behind the rear bumper 42 of the vehicle. However, the hopper spreader apparatus 30 can be mounted to other vehicles including but not limited to, highway trucks and the like, when the particulate material to be spread is salt or sand and the like. Moreover, the hopper spreader apparatus 30 can be used on other types vehicles, such as tractors or farm wagons, for example, when the particulate material to be spread is seed, fertilizer, weed killer, or any other free flowing material. Also, as is stated above, hopper spreader/sprayer apparatus 50 (FIGS. 26-27) can be used to distribute liquid materials (fertilizer, weed killer, etc.) as well as dry free-flow material.

Figure 11:
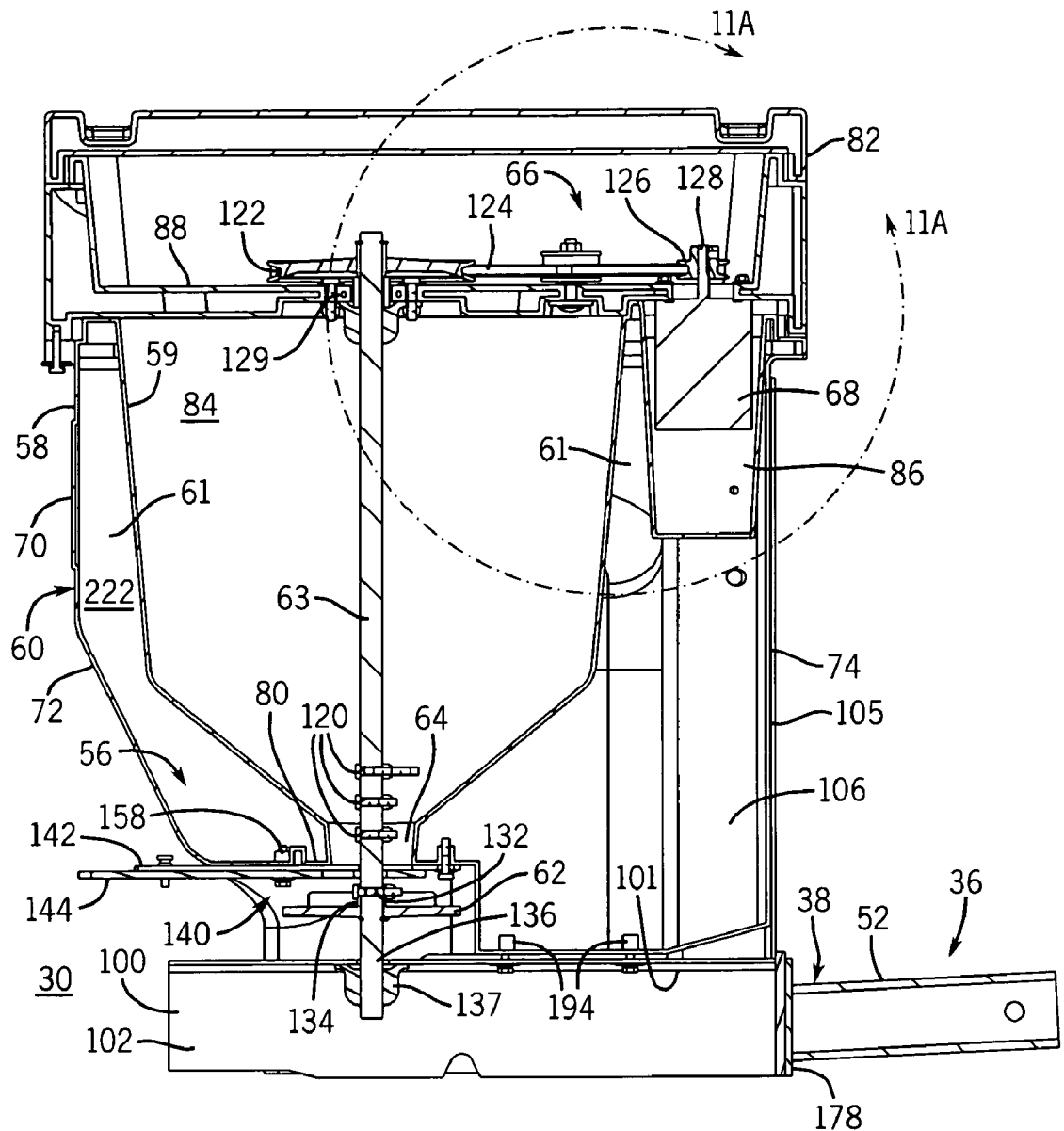
FIG. 11 is a vertical section view taken along the line 11-11 of FIG. 4.

Considering the hopper spreader apparatus 30 in more detail, with reference to FIGS. 1 and 3-8, the basic hopper assembly 34 includes a hopper 60 for containing the dry, free flow material to be spread, and a spinner 62 located at a discharge outlet 64 of the hopper 60 as shown in FIG. 11, for example. The spinner 62 is carried by a drive shaft 63 that is rotated by a drive assembly 66 to spread the particulate material over a wide distribution area. The drive assembly 66 can include a drive motor 68 which can be battery operated. The hopper spreader apparatus 30 includes a variable discharge mechanism 56 for controlling the volume and distribution direction of the material being discharged from the hopper spreader apparatus 30.

The hopper 60 includes a main body portion 70 having a front side 72, a back side 74, a left end 76, a right end 78 and a bottom 80. The open upper end of the hopper body portion 70 is closed by a cover 82 that is removably mounted on the open upper end of the hopper body portion 70. The hopper 60 has a hollow interior that defines a storage compartment or chamber 84 for the dry free flow material to be dispensed. The discharge outlet 64 of the hopper 60 is located in the bottom 80 near the lower end of the hopper 60, shown in FIG. 11, allowing the material contained within the hopper 60 to be fed by gravity to the discharge outlet 64.

The hopper 60 defines has an interior cavity 86 near the top of the back side 74 for containing a drive motor 68 of the drive assembly 66. In addition, the hopper 60 defines an interior ledge 88 that extends between the front side 72 and the back side 74 of the hopper 60 near the top of the hopper for mounting other components of the drive assembly 66 as will be described.

Figure 3:
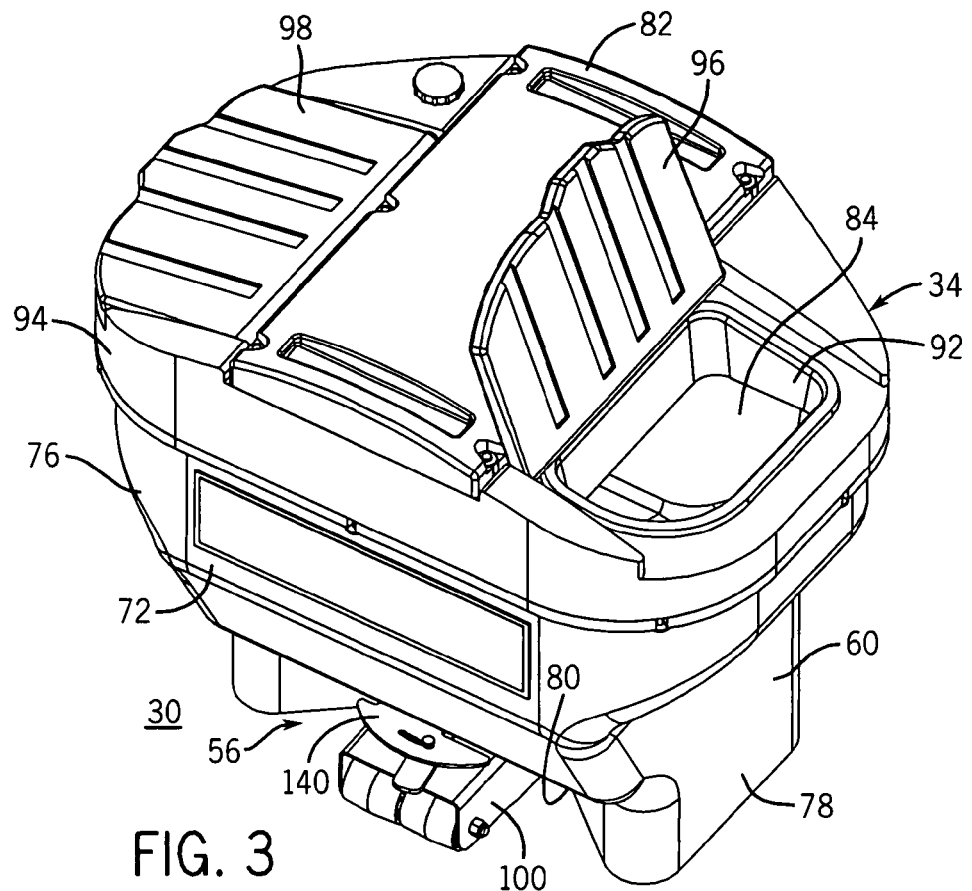
FIG. 3 is a perspective view of the hopper spreader apparatus of FIG. 1.

The cover 82 includes two fill ports 92 and 94 for filling of the hopper 60 with particulate material to be spread. The fill ports 92 and 94 are closed by respective covers 96 and 98 that have one side pivotally mounted to the cover 82, allowing the covers 96 and 98 to be rotated about the side to a generally vertical position as shown in FIG. 3, for example. The hopper 60 can be made of a rigid plastic material, such as polyethylene and the like, and can be molded as a unitary structure. Referring to FIG. 11, the hopper 60 is a double walled hopper including an outer wall 58 and an inner wall 59 that extend around the circumference of the hopper 60. In accordance with the invention, the space 61 between the outer wall 58 and the inner wall 59 can be used as a liquid holding tank 222. The inner wall 59 defines the inner storage chamber 84 of the hopper 60.

Figure 11A:
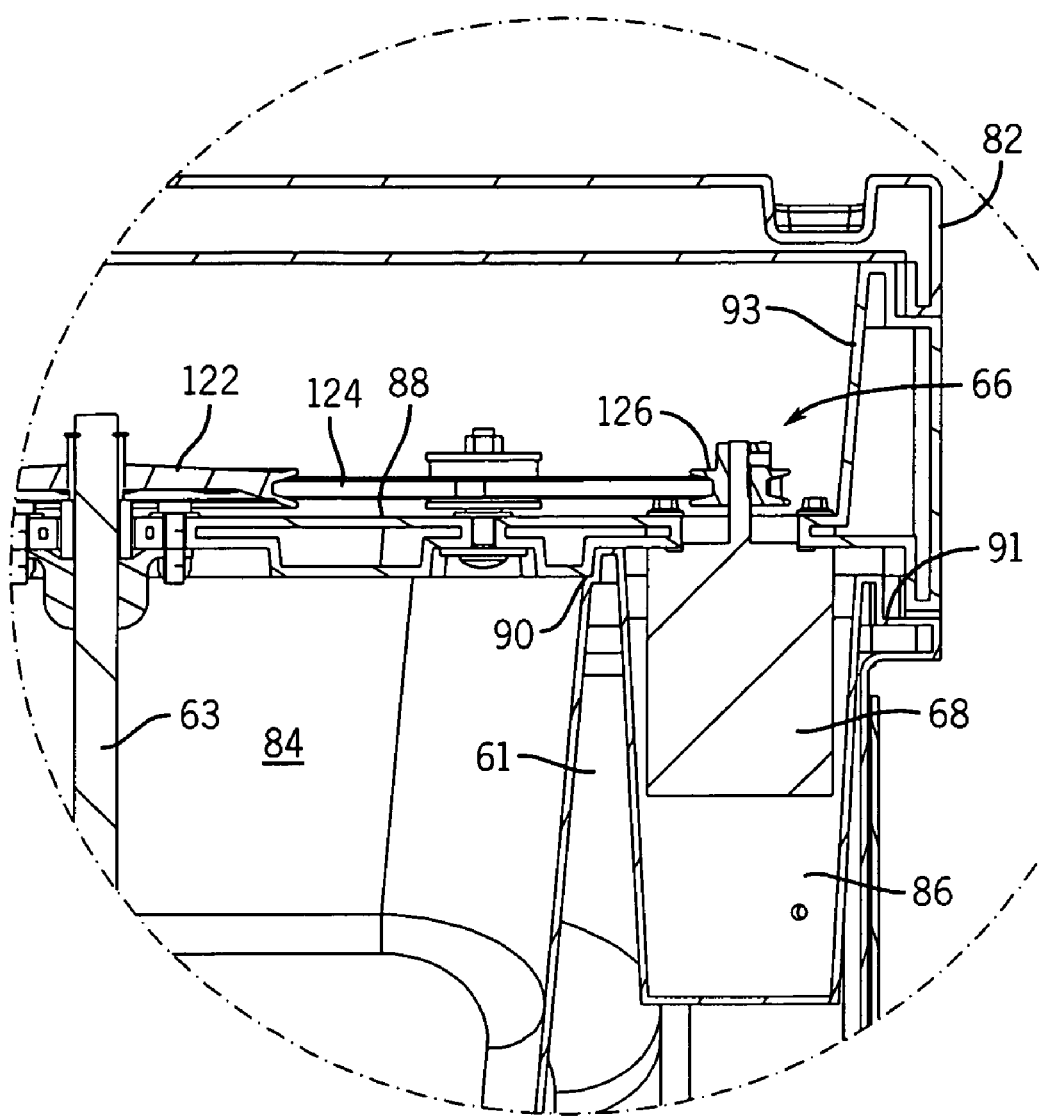
FIG. 11A is enlarged fragmentary view of a portion of the hopper showing motor cover system.

Referring to FIGS. 11 and 11A, the hopper 60 includes a motor plate cover system, including the ledge 88 that defines a compartment 89 for the drive system 66 that is fully sealed from the spreading device. Consequently, the drive pulleys or sheaves 122 and 126, a belt tensioner (not shown), and the drive motor 68 are located away and isolated from the flow material. The drive system 66 is effectively sealed and, if desired, can be sealed with a neoprene foam seal (not shown) on the top cover 82. The drive motor 68 is contained within the cavity 86 to keep the drive motor away from the elements and the material contained in the inner compartment 84 to be dispensed by the hopper spreader apparatus. The motor plate cover system includes a shelf 90 that keeps the material from entering the motor storage cavity 86. The shelf 90 extends all the way around the periphery of the hopper 60 and is engaged by a rim 91 on a motor plate cover 93 that protrudes downwardly, effectively preventing any material from the exterior, i.e., from outside of the hopper 60 (as in outdoors) from reaching the drive motor 68. To the knowledge of applicant, the capability of using the hopper system to seal the drive motor is not done in the industry. Elaborate sealing methods are used or a high cost "sealed" gearbox is used. Inevitably, the outside of the drive motor will be subjected to harmful elements and eventually the drive motor will be damaged. The sealed system in accordance with the invention is low in cost, and simple and easy to maintain. In addition, more components can be put into the area defined by the motor plate cover system because there is room. For example, components that can be best located in an isolated, environment away from the elements include a pump, a battery charger system, and radio control module, for example.

Figure 9:
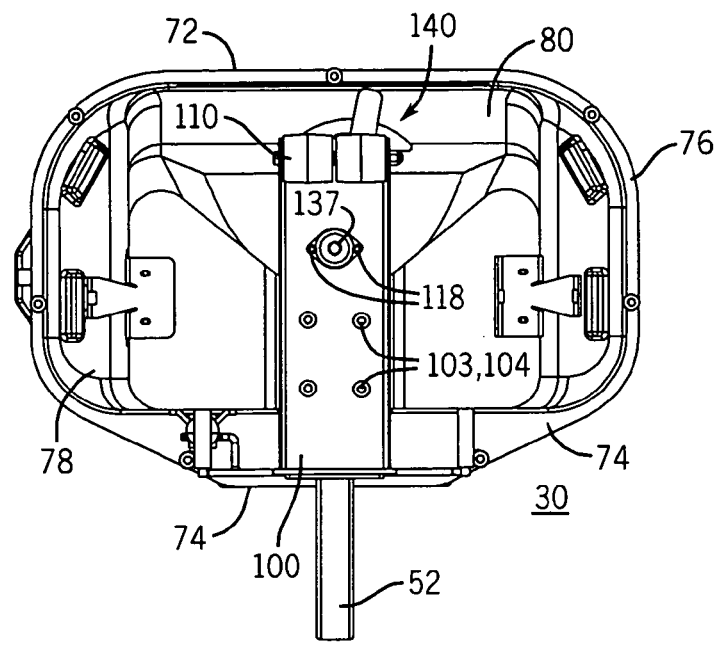
FIG. 9 is a bottom plan view of the hopper spreader apparatus of FIG. 3.
Figure 10:
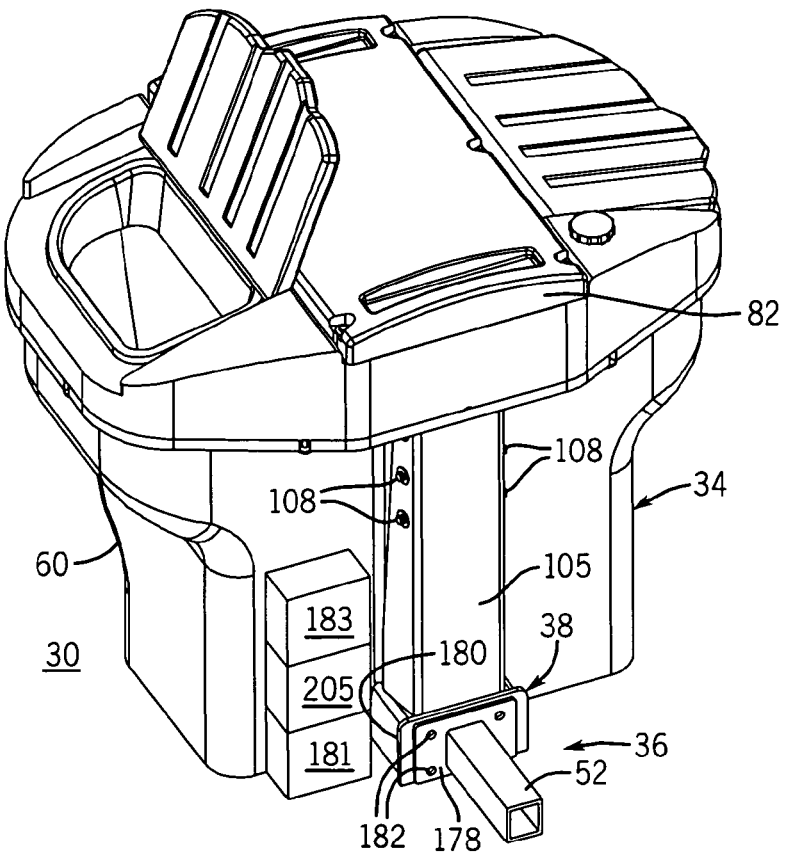
FIG. 10 is a rear perspective view of the hopper spreader apparatus of FIG. 3.

A support beam 100 is mounted to the bottom 80 of the hopper, extending along the bottom 80 of the hopper 60 from the front side 72 to the back side 74. The support beam 100 has an inverted U-configuration having a top 101 and parallel sides 102 depending from the top. The support beam 100 is connected to the bottom 80 of the hopper 60 in any suitable manner, such as by bolts 103 and nuts 104 (FIG. 9). The hopper 60 is stabilized on the support beam 100 by a vertically extending beam 105 that surrounds the vertical rib 106 (FIG. 11) that extends from the top to the bottom of the hopper 60. The vertical beam 105 is secured to the hopper body 70 by a plurality of bolt and nut pairs 108 (FIG. 10).

Referring also to FIG. 2, the hopper 60 has a pair of roller wheels 110 to facilitate moving the hopper spreader apparatus 30. The roller wheels 110 are mounted to the support beam 100 by an axle 111 the ends of which are supported in the sides 102 of the beam 100 at the bottom of the hopper 60 near the front side 72 of the hopper 60.

Referring to FIG. 11, the spinner 62 is mounted on the drive shaft 63 which is rotated by a drive assembly 66 for spreading the dry free flow material being discharged from the hopper. The drive motor 68 is coupled to the drive shaft 63 by a V-belt 124 that extends around a sheave 122 that is connected the drive shaft 63 and a further sheave 126 that is carried by the motor shaft 128. The drive shaft 63 is supported near is upper end by a bearing 129 that is mounted in the ledge 88. By way of example, the sheave 122 can be about nine inches in diameter and the sheave 126 can be about one and one half inches in diameter.

Figure 4:
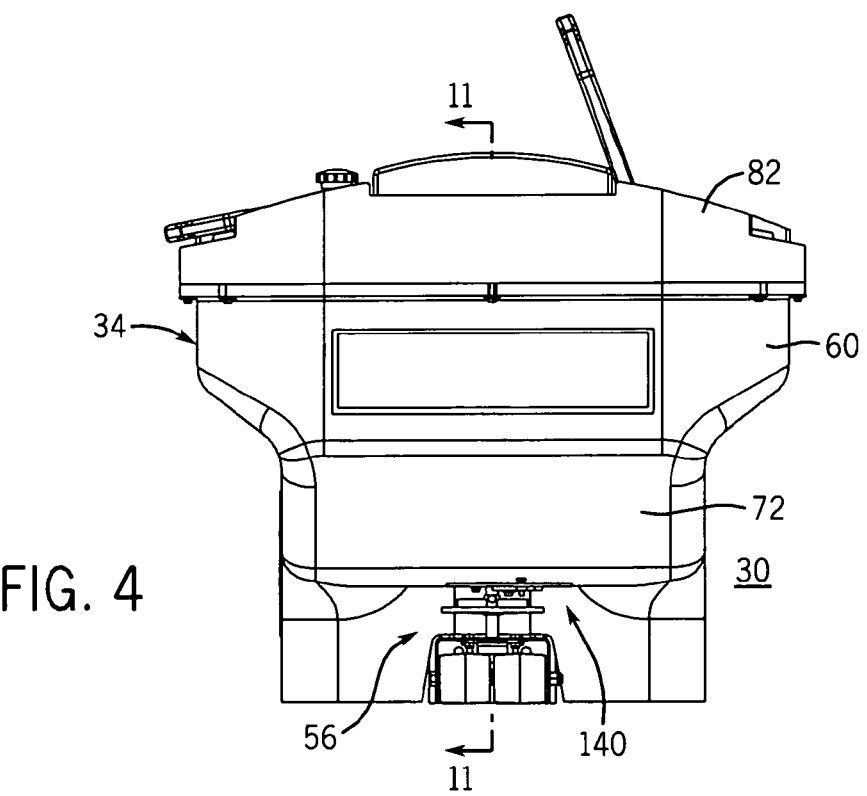
FIG. 4 is a front view of the hopper spreader apparatus of FIG. 3.
Figure 7:
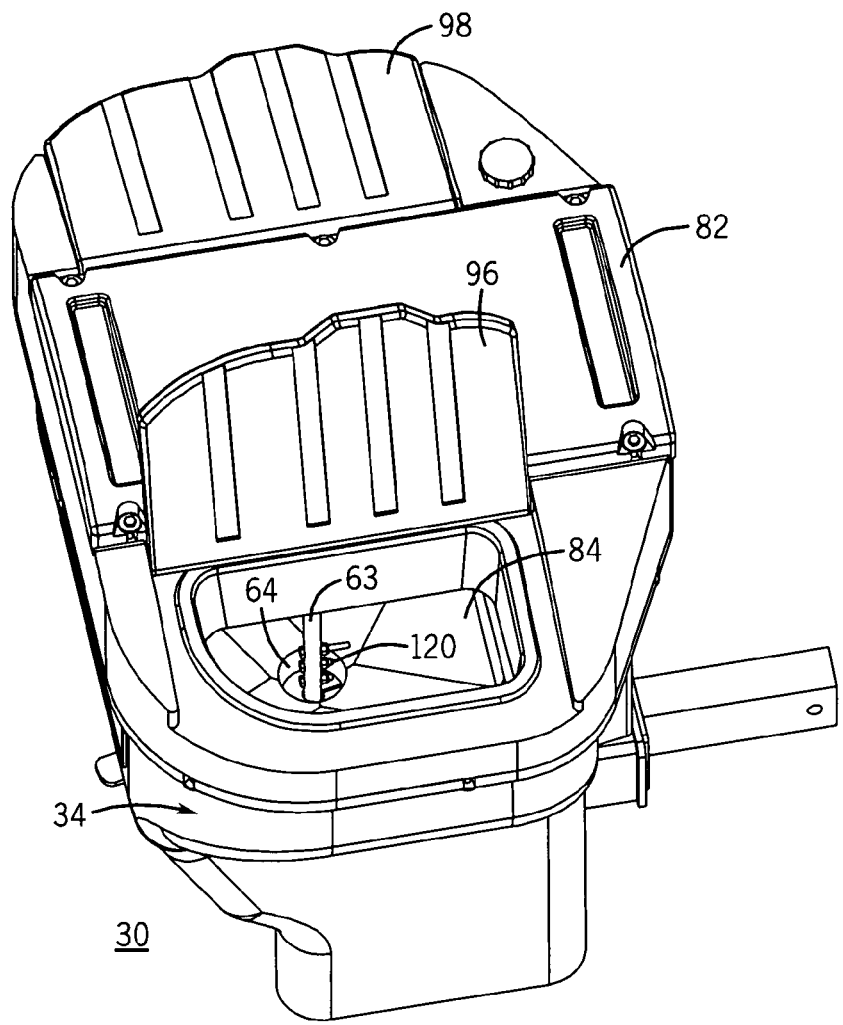
FIG. 7 is a top perspective view of the hopper spreader apparatus of FIG. 3 and showing a chunk buster carried by the drive shaft.
Figure 8:
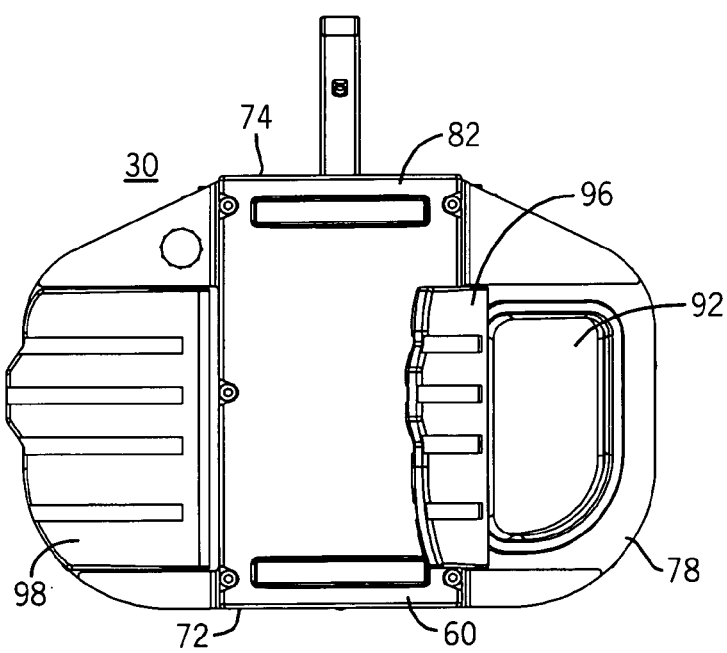
FIG. 8 is a top plan view of the hopper spreader apparatus of FIG. 3.
Figure 25:
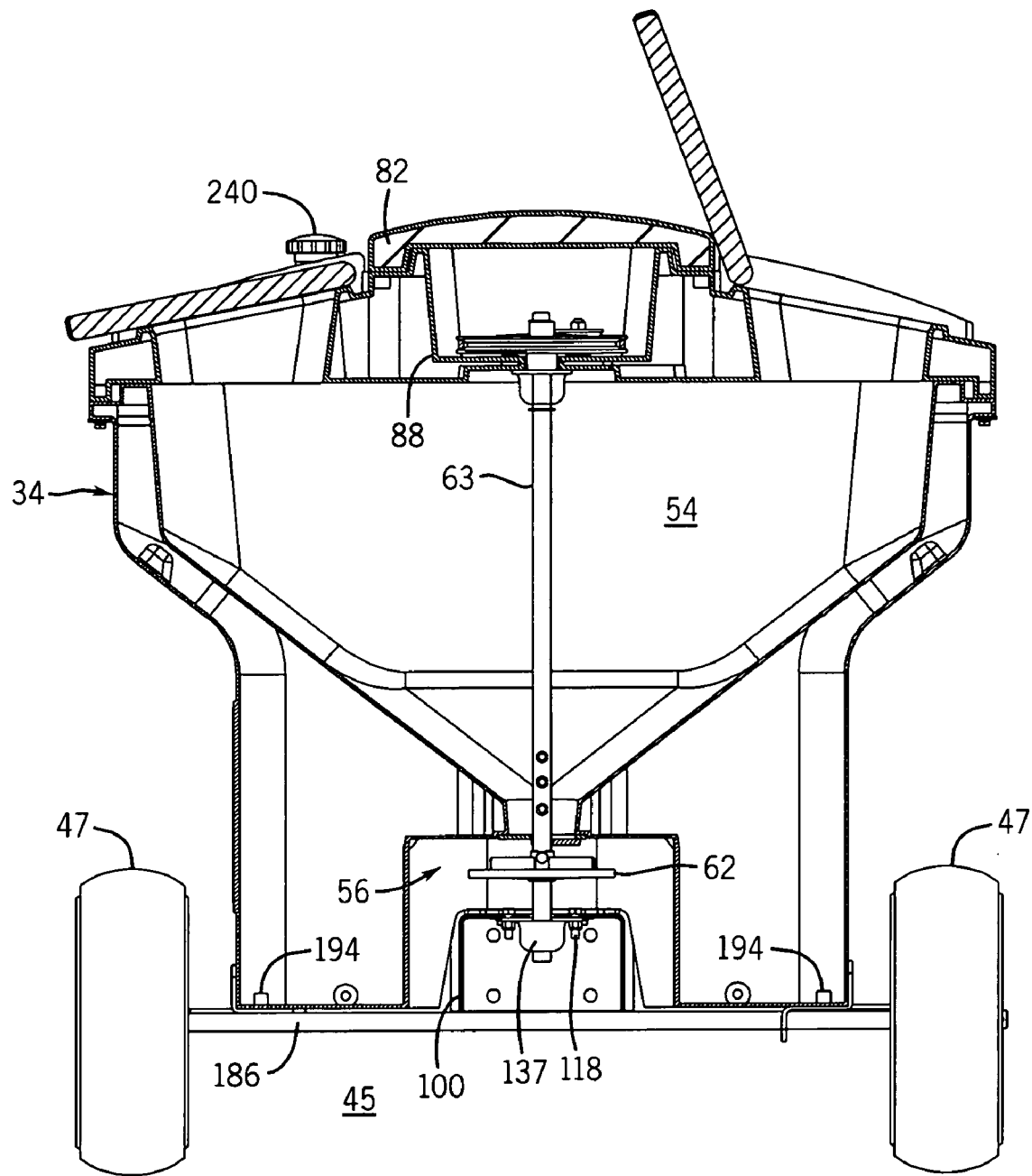
FIG. 25 is a section view taken along the line 25-25 of FIG. 21.

The spinner 62 can be attached to the drive shaft 63 by any suitable hardware such as a set screw 132 that extends through aligned apertures in a hub 134 of the spinner 62 and the drive shaft 63. The lower end of the drive shaft 63 extends through an aperture 136 in the support beam 100 and is journaled in a lower shaft bushing 137. The lower shaft bushing 137 can be secured to the undersurface of the support beam 100 by suitable hardware, such as bolt/nut pairs 118 (FIGS. 9 and 25). The spinner 62 is mounted on the drive shaft 63, spaced above the upper surface of the support beam 100 as shown in FIG. 4. The drive shaft 63 can include a plurality of clump busters 120, shown in FIGS. 7 and 11, to break up clumps in the material being discharged from the hopper 60 as the drive shaft 63 is rotated.

Referring to FIGS. 3, 4 and 11, the variable discharge mechanism 56 includes a flow gate assembly 140 that is supported in an overlying relationship with the spinner 62. The flow gate assembly 140 includes a flow grid-lock-plate 142 and a flow gate member 144 (FIG. 11) which are mounted to the hopper 60 located adjacent to the discharge outlet 64 of the hopper. The flow grid-lock-plate 142 rests against the bottom 80 of the hopper 60 and regulates where the material that is discharged from the hopper 60 is dumped onto the spinner 62. The flow gate member 144 is mounted on the flow grid-lock-plate 142 and movable relative to the flow grid-lock-plate 142 to vary the flow rate through the flow gate assembly 140, and thus, the amount of material discharged from the hopper spreader apparatus 30.

Figure 12:
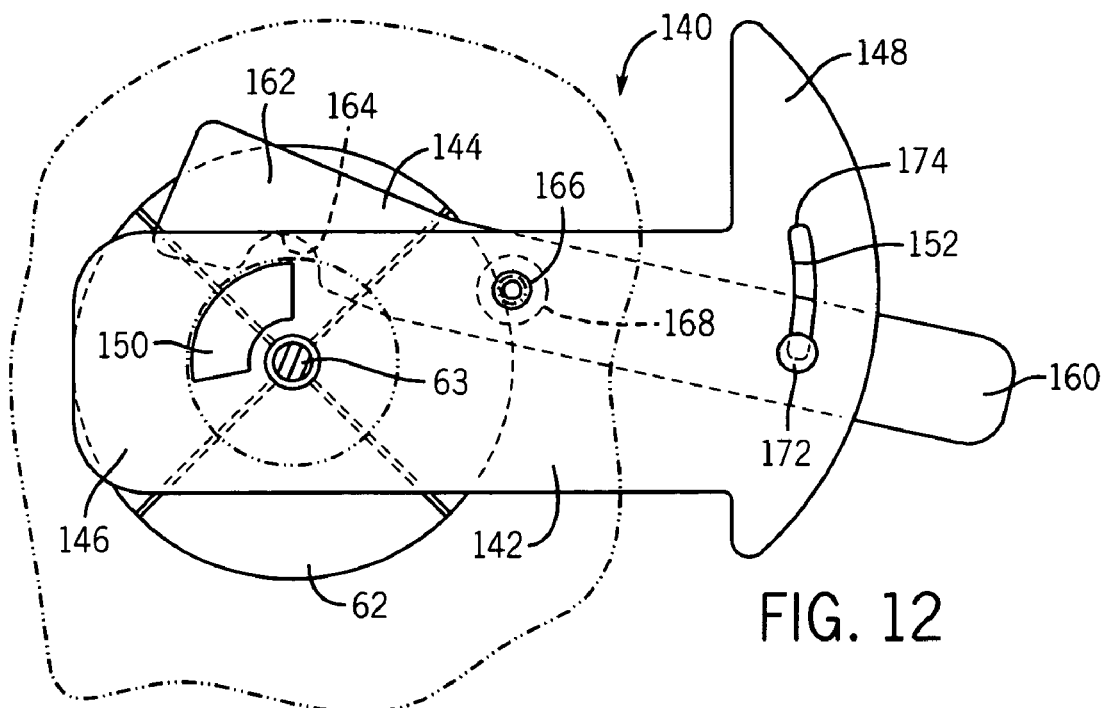
FIG. 12 is an enlarged view illustrating flow gates of the hopper spreader apparatus in a fully open position.
Figure 13:
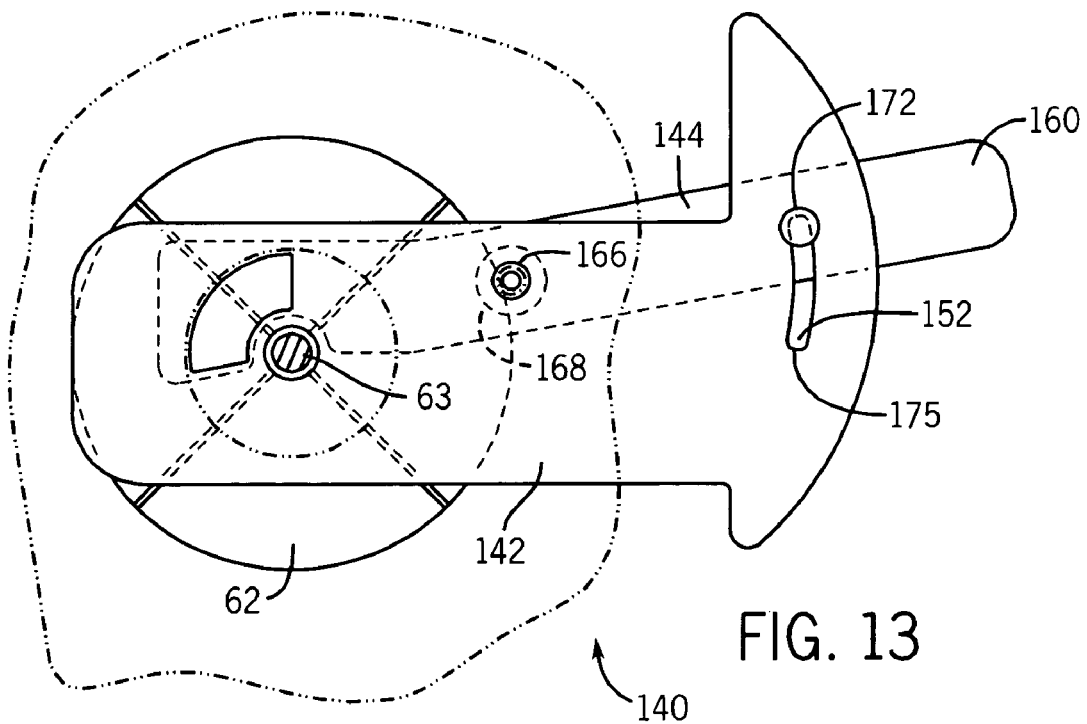
FIG. 13 is an enlarged view illustrating flow gates of the hopper spreader apparatus in a fully closed position.

Referring also to FIGS. 12 and 13, the flow grid-lock-plate 142 is a flat, member having a body portion 146 that is generally rectangular in shape and an arcuate end portion 148. The body portion 146 includes a discharge aperture 150 that is located near the center of the body portion 146. In the preferred embodiment, the discharge aperture is semi-circular or half-moon in shape. The arcuate end portion 148 of the flow grid-lock-plate 142 includes and arcuate slot 152. The drive shaft 63 extends through the flow grid-lock-plate 142 and the flow gate member 144.

The flow grid-lock-plate 142 is held in place by three threaded fastener bolts 154-156 (shown in FIG. 16) which are threaded into threaded molded-in inserts, such as insert 158 (FIG. 11) that is molded into the bottom of the hopper 60. By way of example, the molded in insert can be PEM brand fastener inserts, commercially available from PennEngineering of Danboro Pa., that can accept a threaded fastener bolt. One of the bolts 155 also holds the flow-gate member 144 in place in overlying relation with the flow grid-lock-plate 142.

The flow gate member 144 includes a handle portion 160 that is generally rectangular in shape. One end 162 of the flow gate member 144 bends outwardly at an angle away from the longitudinal axis of the handle portion 160. The end 162 includes a notch 164 that is generally arcuate in shape. The flow gate member 144 is pivotally mounted to the flow grid-lock-plate 142 at a hinge point 166 and is held in place by the bolt 155. A spacer 168 is interposed between the flow gate member 144 and the flow grid-lock-plate 142 at the hinge point 166 of the flow gate member 144 so that the bolt 156 can be cinched down while allowing the flow gate member 144 to rotate freely relative to the flow grid-lock-plate 142. Referring to FIGS. 11-13, the drive shaft 63 extends through the aligned mounting apertures in the flow grid-lock-plate 142 and the flow gate member 144 and is rotatable with respect to the flow grid-lock-plate 142 and the flow gate member 144.

Figure 24:
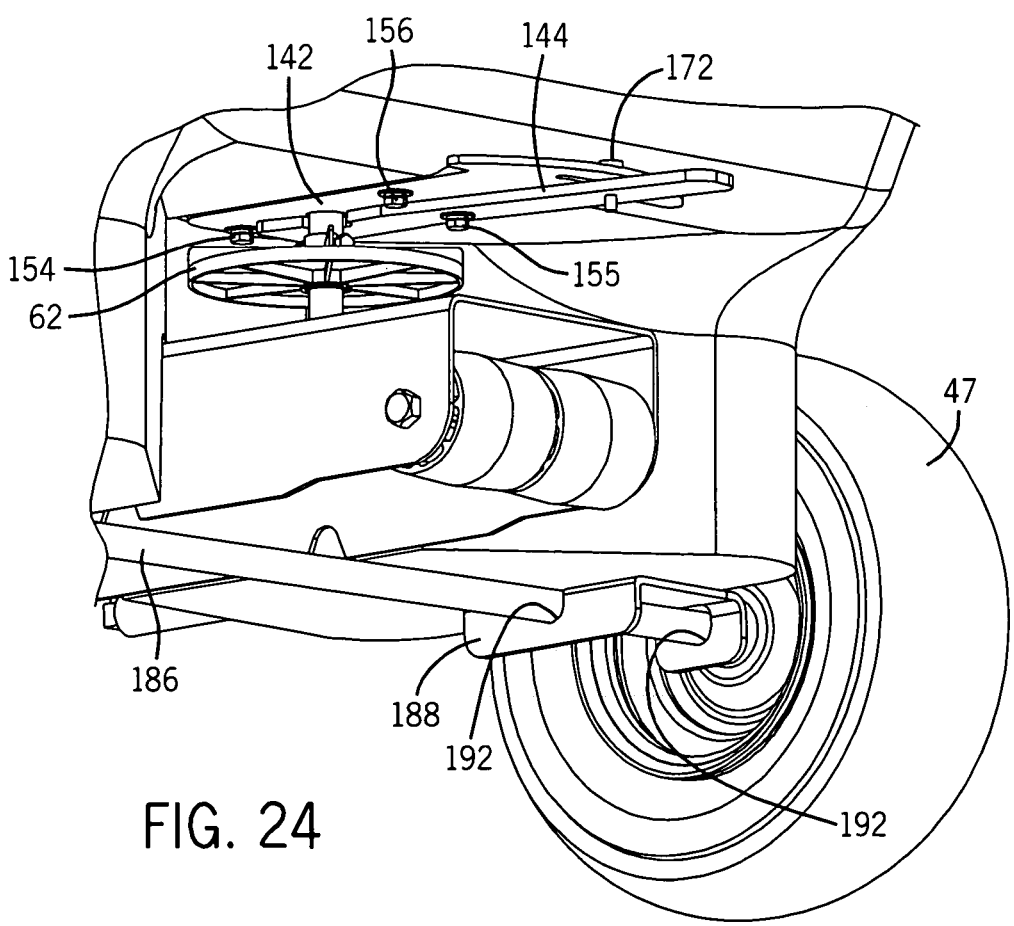
FIG. 24 is an enlarged fragmentary view of the hopper spreader of FIG. 16 and showing details of the flow gate-lock plate and flow gate member of the hopper spreader apparatus.

Referring to FIGS. 12, 13 and 24, a thumb screw 172 maintains the flow gate member 144 in a position to which it has been pivoted. The thumb screw 172 moves in the arcuate slot 152 in the flow grid-lock-plate 142. The ends 174 and 175 of the slot 152 define length of travel stops for the flow gate member 144. The thumb screw 172 can be a nylon screw, that is received in a tapped hole in the flow grid-lock-plate 142. It is pointed out that the configurations of the flow grid-lock-plate 142 and of the flow gate member 144 shown herein are those of a preferred embodiment, and the flow grid-lock-plate 142 and of the flow gate member 144 can be of different in size and/or in shape. Moreover, the location of the hinge point 166 can be different for the flow grid-lock-plate 142 and of the flow gate member 144 having configurations and sizes that are different from those for the flow grid-lock-plate 142 and of the flow gate member 144.

Figure 12B:
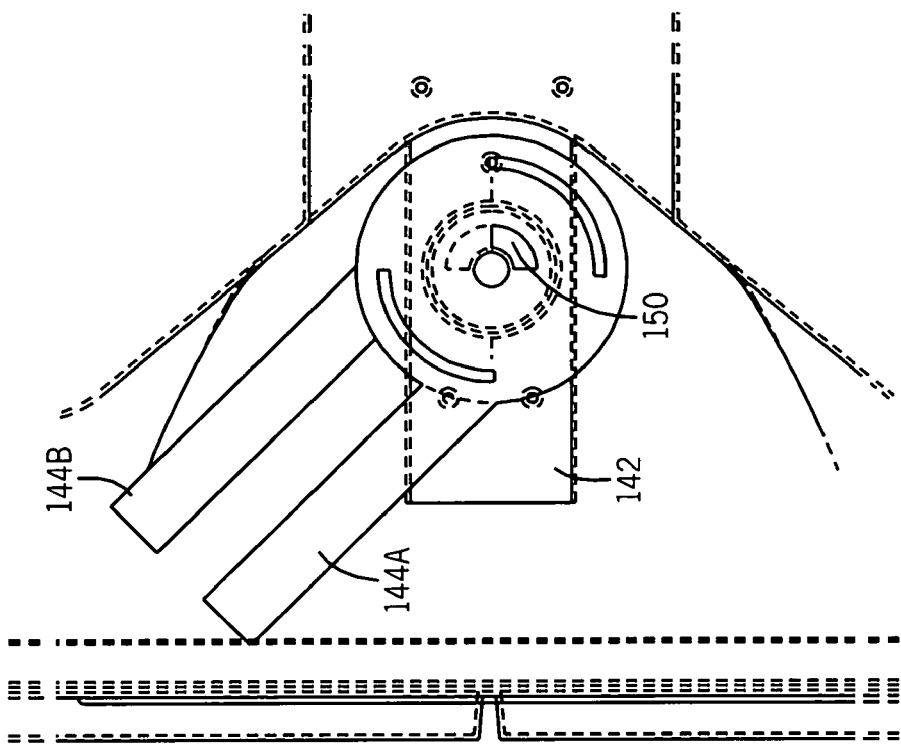
FIG. 12B is view similar to that of FIG. 12A and with the discharge opening shown full open.
Figure 12A:
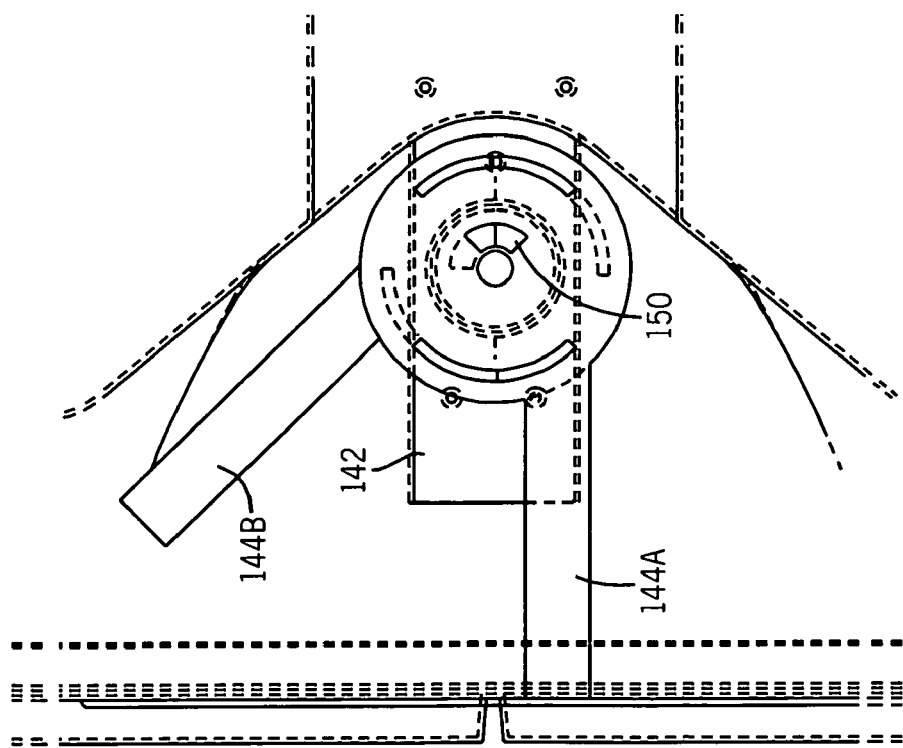
FIG. 12A is a simplified view of a variable discharge mechanism including a dual flow paddles, with the discharge opening shown partially open.
Figure 13A:
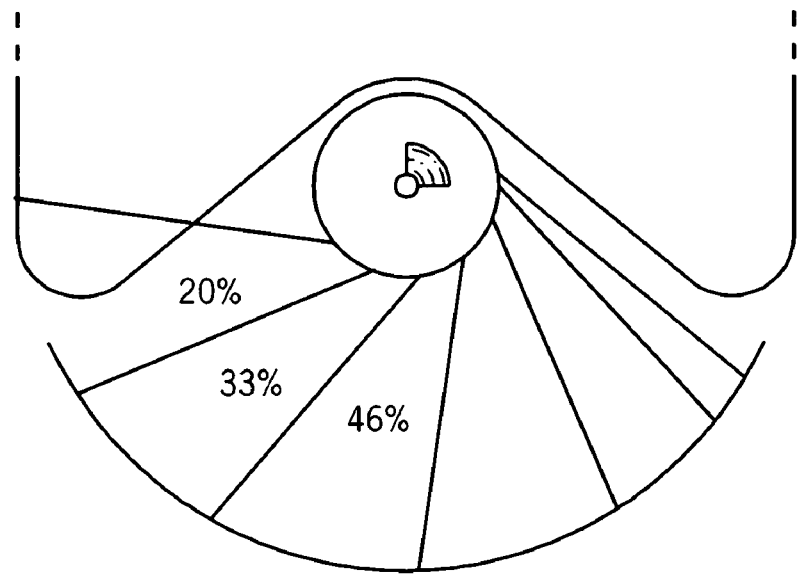
FIG. 13A is a flow diagram for the variable discharge apparatus of FIGS. 12A and 12B.
Figure 13B:
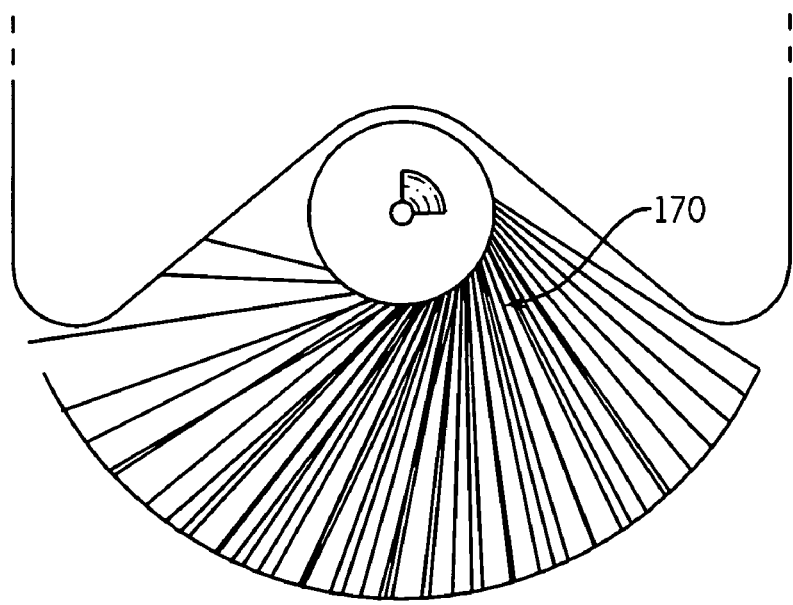
FIG. 13B illustrates flow lines for the flow diagram of FIG. 13A.

In a embellishment, the hopper spreader apparatus 30 can include a variable discharge mechanism is interposed between the discharge outlet and the spinner for controlling both the volume flow rate and the flow direction, or distribution pattern, of the material being dispensed. Referring to FIGS. 12A and 12B, directional controls can be attained using two flow gate paddles or members 144A and 144B, providing a 90° dump area. The flow gate members 144A and 144B are mounted on a common flow grid-lock-plate 142 in the manner described above for flow gate member 144 and flow grid-lock-plate 142. FIG. 12A shows the discharge opening 150 to be about ¼ open and FIG. 12B shows the discharge opening 150 fully open by rotating flow gate member 144A clockwise relative to flow gate member 144B. The discharge opening 150 can be fully closed by rotating flow gate member 144B counter-clockwise relative to flow gate member 144A (the flow gate members 144A and 144B have mirror image symmetry). FIGS. 13A and 13B are flow diagrams for the conditions described above for flow gate members 144A and 144B for a 90° dump area onto the spinner through the discharge opening 150 as the size of the opening is increased by rotating one of the flow gate members 144A and 144B relative to the other flow gate member 90° from a closed condition to an open condition. Three zones are illustrated, which are labeled 20%, 33% and 46%. The initial position is represented at the right hand side of FIG. 12B. The left hand side of FIG. 12B represents the 90° exit position, i.e., which corresponds to the full zone of dump.

The zones cause the material exiting to be more concentrated near the mid point of the spinner than at the edge of the spinner. Thus, as shown in FIG. 13B, the "flow lines" are more centrally located, as indicated by reference number 170, indicating that there are minimal hits on the edge of the spinner.

The flow grid-lock-plate 142 and the flow gate member 144 can be retrofitted to an existing hopper spreader apparatus. The flow gate member 144 can be actuated manually or can be actuated with a cable, or a pneumatic, electric or solenoid system, to adjust the flow rate for being discharged by the hopper spreader apparatus 30.

Figure 14:
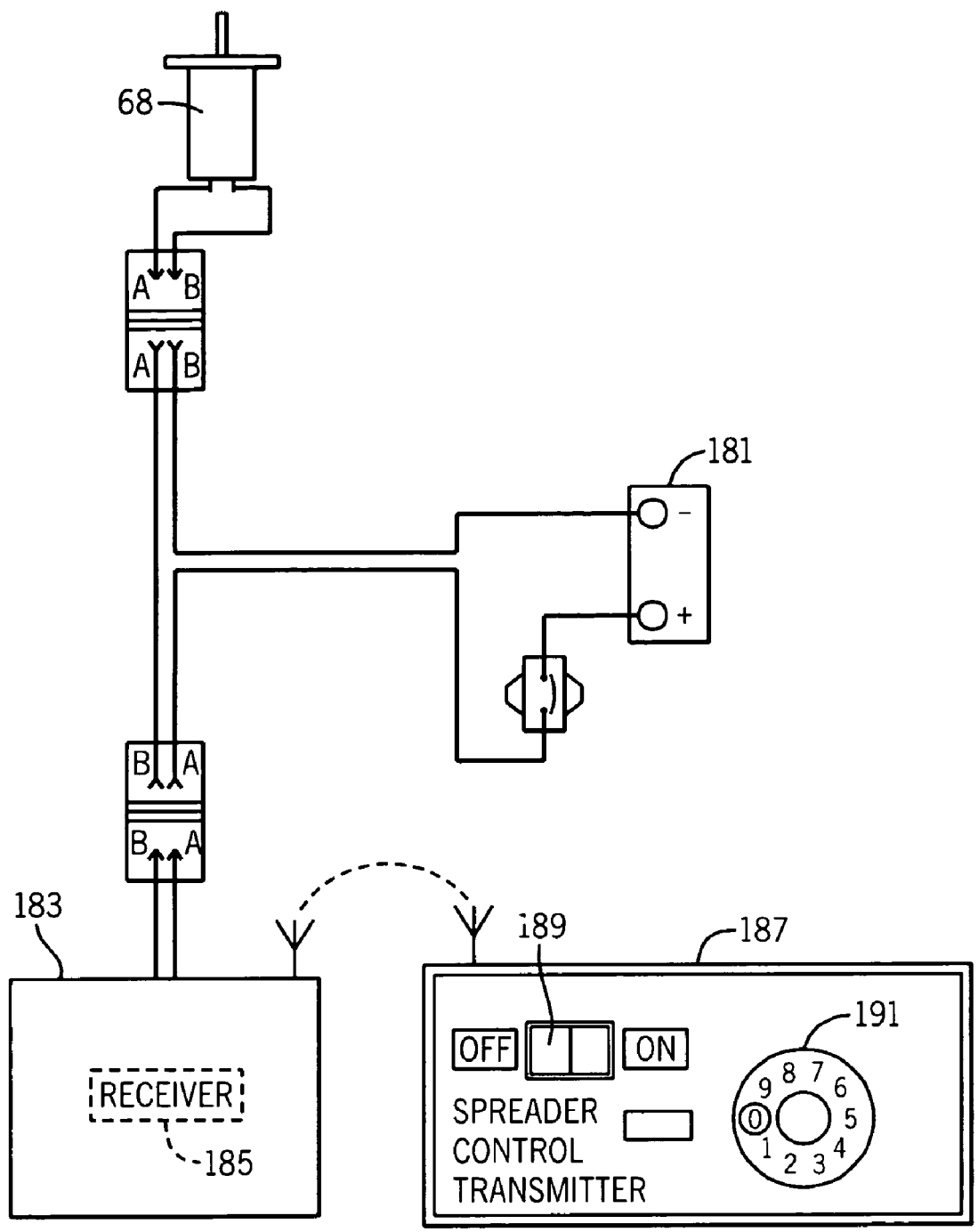
FIG. 14 is a schematic circuit diagram of a battery-operated system for the hopper spreader apparatus of FIG. 3 and which uses a portable radio frequency control unit.

Referring to FIGS. 11, 12 and 13, the flow gate assembly 140 is mounted on the hopper 60, with the flow gate members 144 and 144 interposed between the discharge outlet 64 of the hopper 60 and the spinner 62. The flow gate member 144 is located beneath the flow grid-lock-plate 142 with the discharge aperture of the flow gate member 144 located to overlap at least a portion of the discharge aperture 150 of the flow grid-lock-plate 142 as shown in FIGS. 13 and 14, for example.

As shown in FIGS. 12 and 13, the aperture or delivery opening 150 overlies the center of the spinner 62. The flow control mechanism 140 causes the material being discharged to exit in approximately a 180° degree pattern out the front of the hopper spreader apparatus so that minimal amounts of the material hit the deflectors. This arrangement has an advantage over the known spreaders in that flow is directed and the material being discharged does not hit the vehicle and minimal amounts of the material hits the deflectors. This is significant in obtaining proper flow out the hopper spreader apparatus. Otherwise, the material being discharged from the hopper would dump all over the spinner and would exit the spinner in a 360° pattern, which is unacceptable. When material hits the deflectors, then it accumulates on the ground and is not spread properly.

The size of delivery opening 150 can be varied to vary the discharge rate by providing relative rotation between the flow grid-lock-plate member 142 and the flow gate member 144 to adjust the discharge volume flow rate. Accordingly, the material being discharged from the hopper 60 is directed more toward the center of the spinner 62 than toward the outer edge of the spinner. Consequently, it takes longer for the material being discharged to be "spread" by the spinner 62, than were the material applied to the edge of the spinner as is the case for prior art discharge mechanisms.

Referring to FIGS. 12 and 13, by way of example, the relative orientation of the flow grid-lock-plate member 142 and the flow gate member 144 can be such that a maximum discharge volume flow rate is provided for particulate matter being discharged from the hopper 60 or minimum (which can be zero flow). Setting the flow gate member 144 in the position shown in FIG. 12 represents the setting for a maximum discharge flow rate. Setting the flow gate member 144 in the position shown in FIG. 13 represents the setting for a minimum or zero discharge flow. The position of the handle is indicative of the setting. Thus, with a glance, the operator can tell the current volume flow rate setting for the variable discharge apparatus 56.

Referring to FIGS. 5 and 6, by rotating the spinner 62 as the particulate material is being delivered to the spinner 62 through the variable discharge apparatus 140, the particulate material is centrifugally propelled by the spinner 62 in a wide pattern onto the ground surface on which the vehicle 32 is moving. Because the half-moon shaped apertures are located over the spinner 62, but are offset slightly forwardly with respect to the center of body portion, the material being discharged from the hopper 60 is directed more toward the center of the spinner 62 than toward the outer edge of the spinner. Consequently, it takes longer for the material being discharged to be "spread" by the spinner 62, than were the material applied to the edge of the spinner as is the case for prior art discharge mechanisms.

Referring to FIGS. 2, 5, 10 and 11, the mounting assembly 36 of the hopper spreader apparatus 30 includes hitch adapter 38, shown in FIG. 10, that facilitates removable mounting of the hopper spreader apparatus 30 to the vehicle 32 using the trailer hitch 40 of the vehicle 32 as shown in FIG. 2, for example.

The hitch adapter 38 includes a hitch tube 52 that is generally rectangular in cross section and is dimensioned to be received in the rectangular opening (not shown) of a conventional trailer hitch. The hitch tube 52 is of a strong inflexible material, such as steel, and is of sufficient length to support the hopper spreader apparatus 30 spaced rearwardly of the vehicle tailgate 33 (FIG. 1) at the rear of the vehicle 32. The hitch tube 52 includes a mounting flange 178 that is coupled to the front end 180 of the support beam 100 (FIG. 10). By way of a non-limiting example, the mounting flange 178 can be connected to the front end 180 of the support beam 100 by bolt and nut pairs 182.

Referring to FIG. 14, there is shown a schematic circuit diagram of a battery-operated system for the hopper spreader apparatus of FIG. 3 and which uses remote radio frequency control. Preferably, the hopper spreader apparatus 30 includes an on-board battery 181, such as a standard 12 volt tractor battery.

The operation of the hopper spreader apparatus 30 can be controlled remotely using radio frequency (RF) signaling. The hopper spreader apparatus 30 includes a control unit 183 that includes a radio frequency (RF) signal receiver 185 that responds to coded RF signals transmitted by a portable RF transmitter 187 to control the on/off and speed control functions for the hopper spreader apparatus 30. Control of the operation of the hopper spreader apparatus 30 using the wireless remote control unit allows the operator to be located anywhere within the receiving range of the RF receiver and the operator is not required to be in a cab of the vehicle when control changes are made.

In a preferred embodiment, the control unit 183 can provide variable speed control. The portable transmitter 187 includes an on/off switch 189 for activating the control unit and a key pad 191 for selecting the operating speed for the drive motor 68.

The control unit 183 is turned on by the operator depressing the on/off switch 189 on the portable transmitter 187. The control unit 183 applies power from the on-board battery 181 to the drive motor 68 which will automatically cycle at full torque and rpm to give an initial burst of material and to insure that the spinner 62 reaches optimum speed rapidly. The control unit 183 then will operate at the speed selected by the operator until the control unit is 183 shut off by the operator depressing the on/off switch 189 on the portable transmitter 187. The control unit 183 can be mounted on the outer wall of the hopper 60 as shown in FIG. 10 and, as shown in FIG. 14, is electrically connected to the drive motor 68 that is located within compartment 86 (FIG. 11) located forwardly of the outer wall of the hopper 60 on which the control unit 183 is mounted. The battery 181 can be mounted on the hopper 60 in the proximity of the control unit 183. Suitable support brackets and mounting hardware (not shown) can be used to mount the control unit 183 and the battery 181 on the hopper 60.

Figure 15:
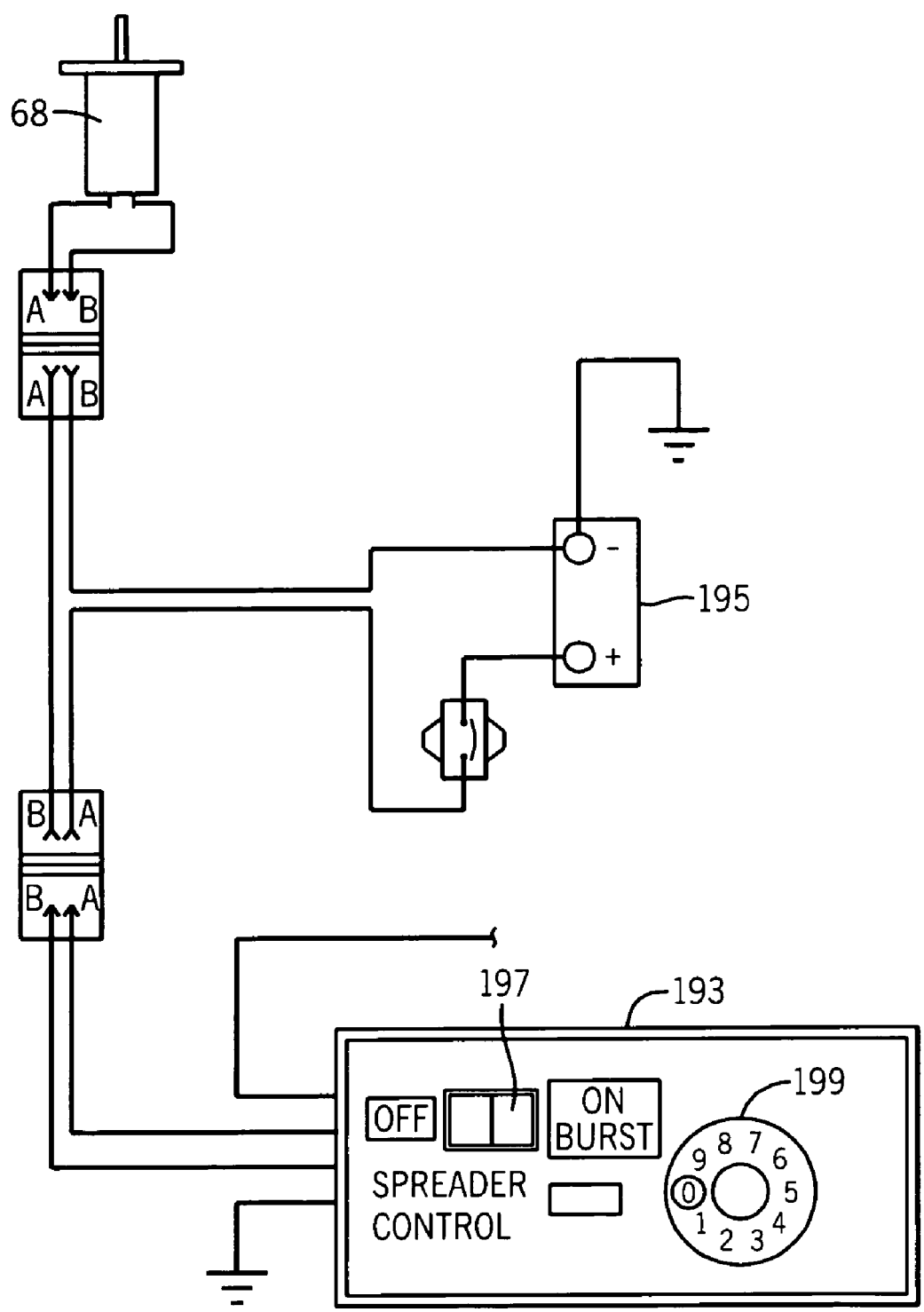
FIG. 15 is a schematic circuit diagram of a hard-wired electrical system for the hopper spreader apparatus of FIG. 3.

Referring to FIG. 15, alternatively, the hopper spreader apparatus 30 can include a control unit 193 that provides on/off control of the operation of the hopper spreader apparatus 30. FIG. 15 is a schematic circuit diagram of a hardwired electrical system for the hopper spreader apparatus of FIG. 3 using the battery 195 of the vehicle to which the hopper spreader apparatus 30 is mounted, or, preferably, an on-board battery, such as the battery 181 used by the RF-based control unit 183 shown in FIG. 14. The control unit 193 includes an on/off switch 197 which, when operated, provides only one operating speed for the drive motor 68. When the switch 197 is operated to the on position, the drive motor 68 operates at full spread speed. When the switch 197 is operated to the off position, the drive motor 68 is turned off and the hopper spreader apparatus 30 stops spreading. Alternatively, the control unit 193 can provide variable speed control as described above with the addition of a key pad or some other type of select switch 199. The control unit 193 can be mounted on the outer wall of the hopper 60 in the manner of control unit 183 as shown in FIG. 10, such that the hopper spreader apparatus is a self-contained unit. However, the control unit 193 can be located within the cab of the vehicle, particularly in an application in which the hopper spreader apparatus in mounted on the vehicle.

The hopper spreader apparatus 30 can include a battery charging unit 205 that is adapted to be plugged into a conventional electrical outlet by an electrical cord (not shown) and electrically connected to the battery terminals for supplying charging current to the battery 181 for recharging the battery 181 when the hopper spreader apparatus 30 is not in use. The battery charging unit 205 can be mounted on the hopper 60 in the proximity of the control unit 183 as shown in FIG. 10, or alternatively, can be incorporated into the control unit 183 (or control unit 193, FIG. 15).

Referring to FIGS. 16-22, in accordance with an embellishment, the hopper spreader unit 34 can include a wheel assembly 44 having pair of wheels 47 mounted on the bottom of the hopper 60 of the basic hopper assembly 34, forming a hopper spreader apparatus 45 that can be towed by the vehicle 32 as shown in FIG. 17. The wheel assembly supports the hopper spreader apparatus on a surface on which the vehicle is travelling, allowing the hopper spreader/sprayer apparatus to be moved by the vehicle or pushed manually along the surface. The hopper spreader apparatus 45 includes a coupler 184, allowing the hopper spreader apparatus 45 to be coupled to a conventional ball hitch of the vehicle. Moreover, the end of the hitch, including the coupler 184, can serve as a handle, allowing the wheeled hopper spreader apparatus 45 to be pushed or pulled manually by a user. Optionally, a handle can be substituted for the coupler 184 for manual use.

Referring to FIGS. 21 and 23-25, the wheel assembly 44 includes an axle 186, with the wheels 47 being rotatably mounted on the axle 186. The wheel assembly 44 further includes a pair of axle mounting brackets 188 that are adapted to be removably secured to the bottom 80 the hopper 60 in any suitable manner, such as by threaded fasteners 190 that extend through mounting apertures in the mounting brackets 188 and are threaded into threaded molded-in inserts, such as inserts 194 (FIG. 25), that are molded into the bottom of the hopper 60. By way of example, the fastener inserts 194 can be PEM brand fastener inserts. Alternatively, mounting plates (shown) may be provided on the bottom of the hopper to facilitate attaching the mounting brackets 188 to the hopper. As shown in FIG. 24 the axle mounting brackets 188 are U-shaped and include a pair of aligned apertures 192 through which the axle 186 extends. The axle mounting brackets include for securing the axle mounting brackets to the bottom of the hopper 60. In accordance with a feature of the invention the set of wheels is adapted to be removably installed on the hopper. Thus, the hopper spreader apparatus is a convertible unit that can be used without the set of wheels 44 for direct mounting on a vehicle, or the set of wheels can be attached to the hopper near its bottom portion, allowing the hopper spreader apparatus to be towed by a vehicle, or pushed by hand. A modified hitch adaptor can be used to compensate for the difference in vertical height between the hitch tube and the ball hitch when the hopper spreader apparatus is adapted to be towed by a vehicle.

Figure 19:
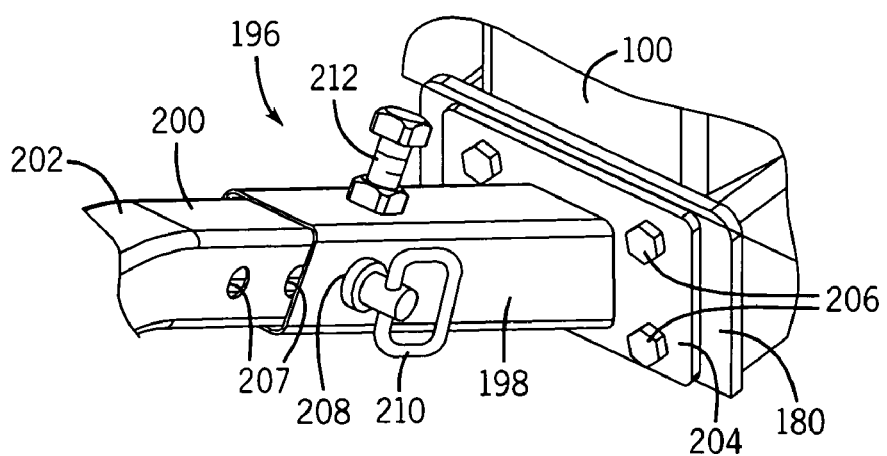
FIG. 19 is an enlarged view of the hitch assembly of the hopper spreader apparatus of FIG. 16.
Figure 18:
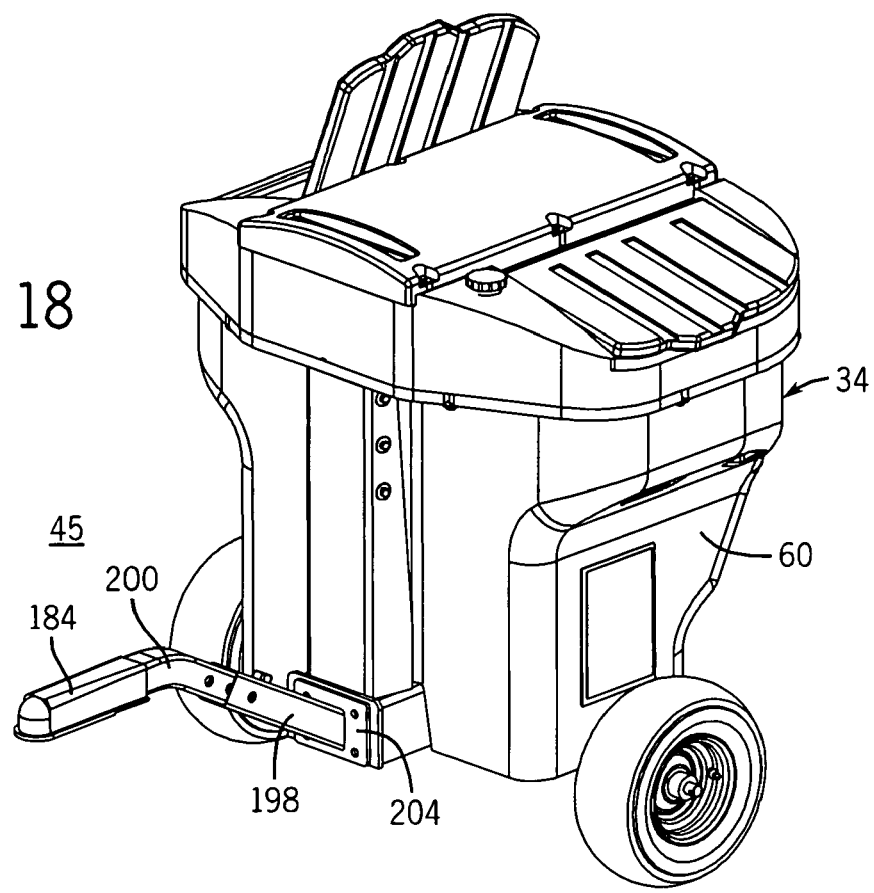
FIG. 18 is a rear perspective view of the hopper spreader apparatus of FIG. 16.
Figure 20:
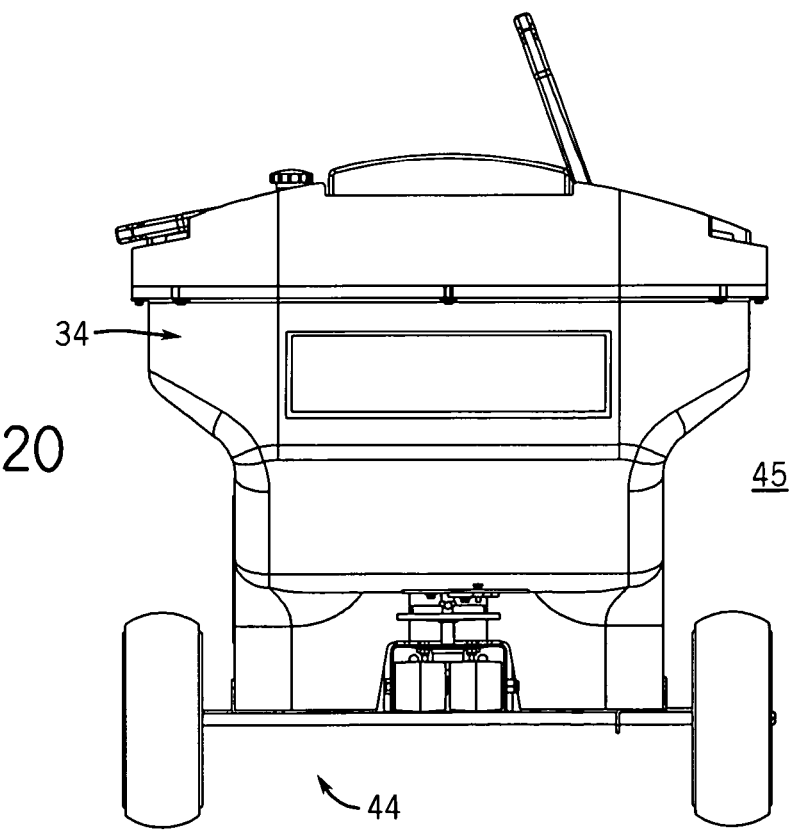
FIG. 20 is a front view of the hopper spreader apparatus of FIG. 16.
Figure 21:
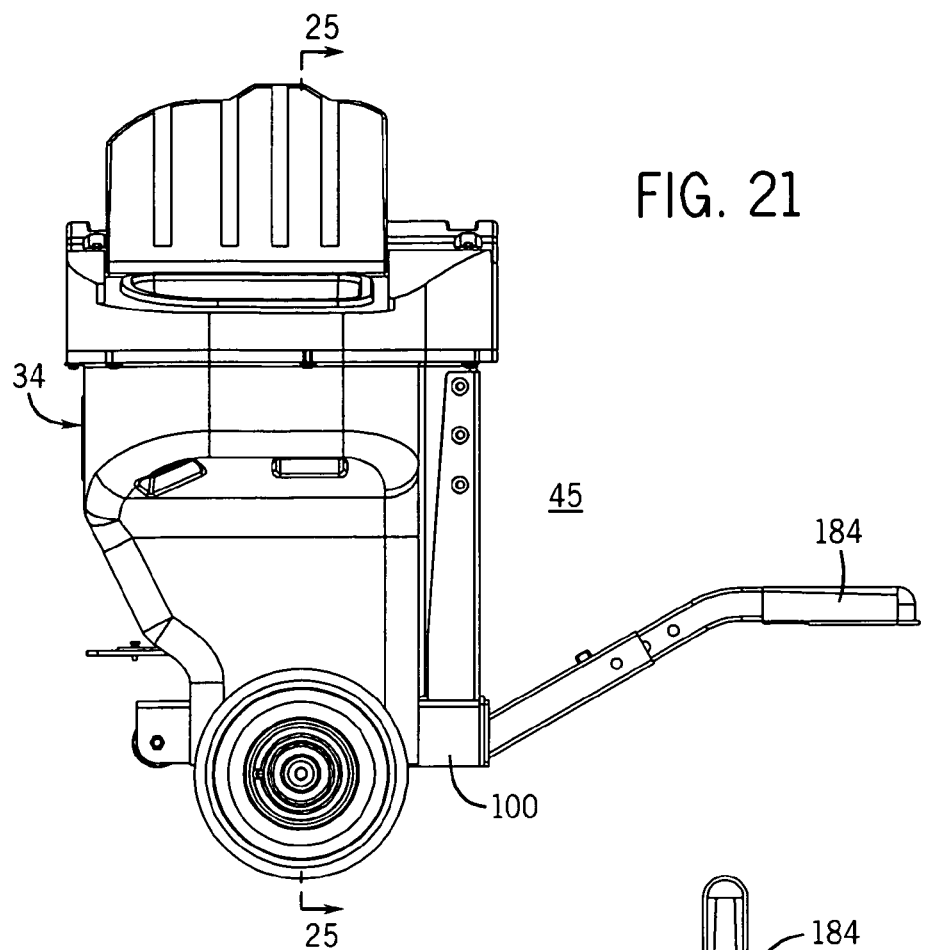
FIG. 21 is a side elevation view of the hopper spreader apparatus of FIG. 16.
Figure 22:
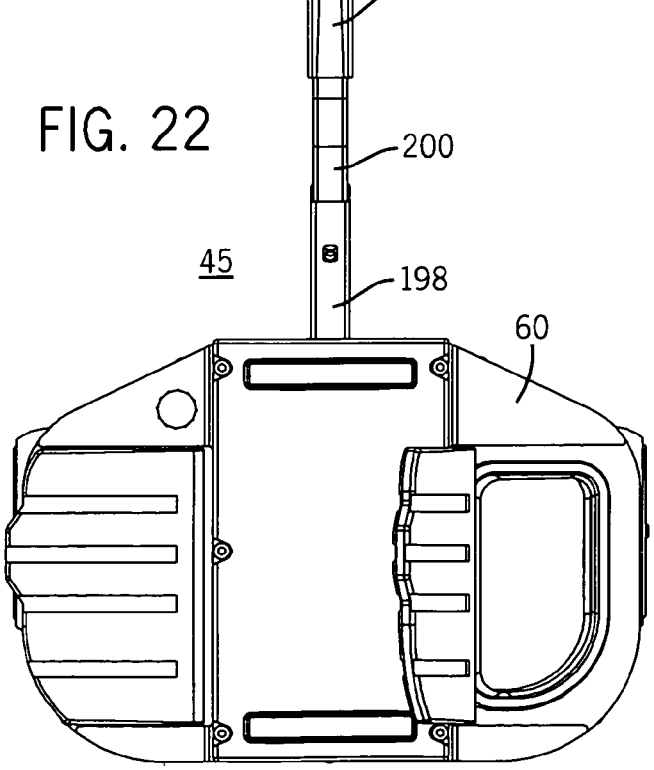
FIG. 22 is a top plan view of the hopper spreader apparatus of FIG. 16.
Figure 23:
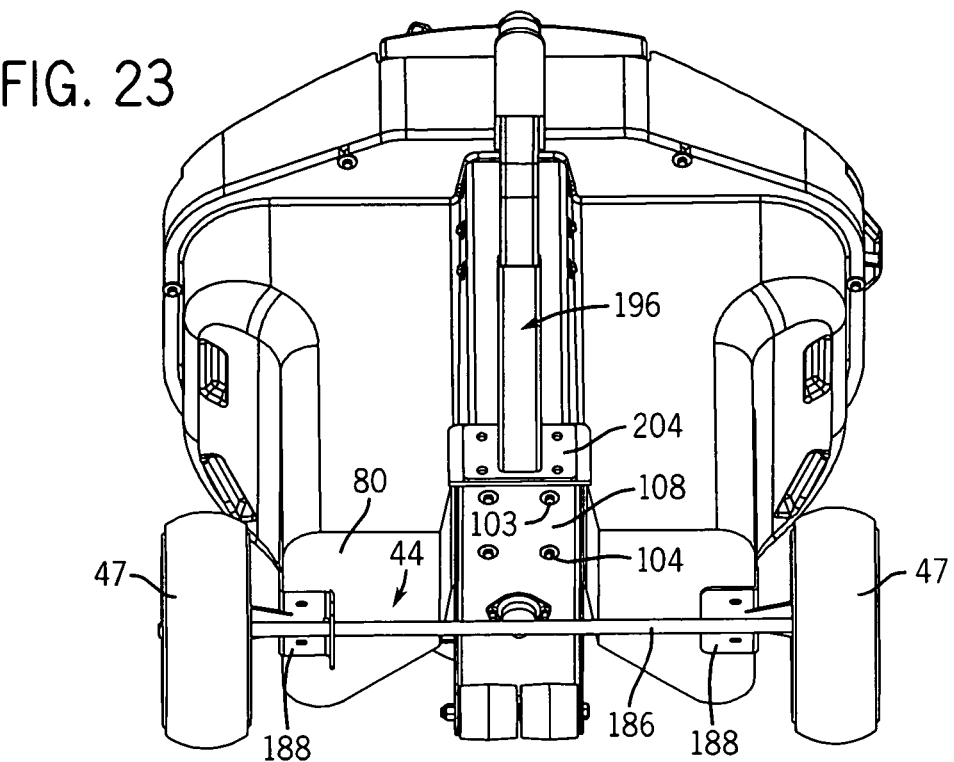
FIG. 23 is a bottom view of the hopper spreader apparatus of FIG. 16 and showing mounting the wheel assembly on the hopper.

More specifically, with reference to FIGS. 18 and 19, the hopper spreader apparatus 45 includes the basic hopper assembly 34 and a modified hitch adapter 196 for coupling the hopper spreader to the vehicle ball hitch. The modified hitch adapter is different from the hitch adapter 38 (FIG. 11), but, alternatively, an adapter can be used that couples hitch adapter 38 to the ball hitch. The modified hitch adapter 196 includes a hitch tube 198 and a draw tube 200 having one end 201 received telescopically by the hitch tube 198, the opposite end 203 of the draw tube 200 carrying the coupler 184. The draw tube 200 is generally rectangular in cross section and has a bend 202. The hitch tube 198 includes a mounting flange 204 that is coupled to the front end 180 of the support beam 100 (FIG. 19). By way of a non-limiting example, the mounting flange 204 can be connected to the front end 180 of the support beam 100 by bolt and nut pairs 206.

For the purpose of compensating for the difference in height between the ground riding hopper spreader unit 34 and the location of the ball hitch on the vehicle, the hitch tube extends upwardly at an angle from the mounting flange 204, as does the end 201 of the draw tube 200 up to the bend 202 as shown in FIG. 19, for example. The relative positions between the hitch tube 198 and the draw tube 200 is adjustable to allow adjustment in the height of the coupler 184 relative the ground. The draw tube 200 has a plurality apertures 207 formed laterally through the draw tube 198 and located to be selectively aligned with a mounting aperture 208 formed laterally through the hitch tube 198. The draw tube 200 is connected to the hitch tube 198 by a pull pin 210 that extends through apertures aligned apertures 207 and 208 of the draw tube 200 and hitch tube 198. A locking bolt 212 extending through the upper side of the hitch tube 198 can be tightened down to further secure the hitch tube 198 to the draw tube 200 after the pull pin 210 is in place.

Figure 26:
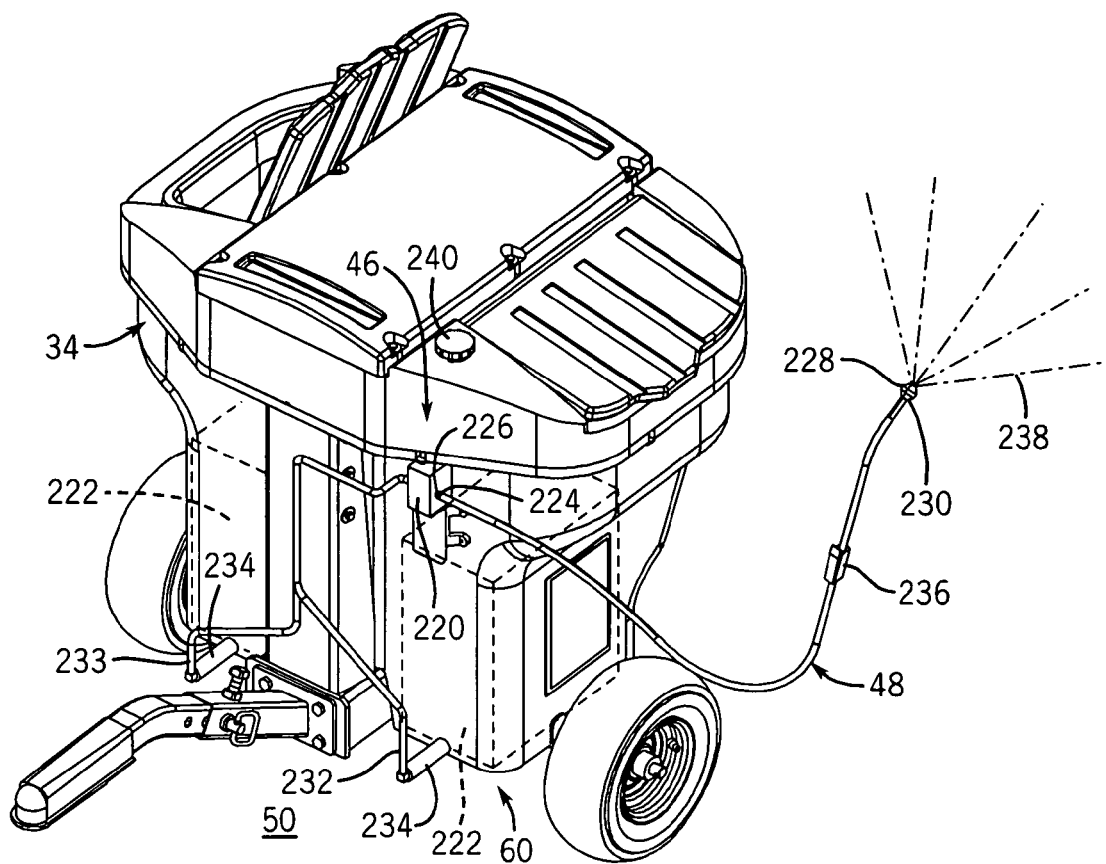
FIG. 26 is a rear perspective view of a hopper spreader/sprayer apparatus including the hopper spreader apparatus of FIG. 16 and a sprayer system.
Figure 27:
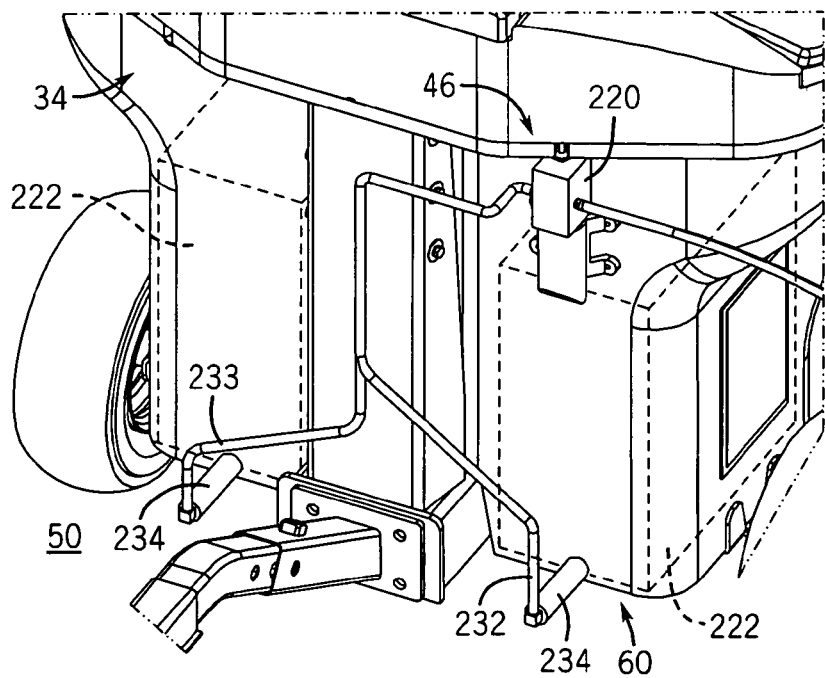
FIG. 27 is an enlarged perspective view of the hopper spreader/sprayer apparatus of FIG. 24 and showing details of the sprayer system.

Referring to FIGS. 26 and 27, in a further embellishment, the basic hopper spreader unit 34 can include a sprayer apparatus 46, providing a hopper spreader/sprayer apparatus 50 for dispensing both liquid material and dry free flow material. In a preferred embodiment, the hopper spreader/sprayer apparatus 50 includes the wheel assembly 44 and is similar to the hopper spreader apparatus 45 described above with reference to FIGS. 16-25. However, the hopper spreader/sprayer apparatus 50 can be adapted for mounting on a vehicle using the hopper spreader unit 34 and the hitch adapter 38 described above with reference to FIGS. 1-13.

Referring to FIGS. 26 and 27, the sprayer apparatus 46 can include a flow control apparatus, such as a fluid pump 220, for drawing liquid to be dispensed from a tank 222 that is defined by the dual wall hopper 60 as described above with reference to FIG. 11. The hopper 60 has a fill cap 240 removably mounted on the upper end of the hopper to fill the tank 222 with liquid to be dispensed. The liquid distribution device can be embodied as spray wand 48 which can be conventional, having one end 224 adapted to be connected to a fluid outlet 226 of the fluid pump. The spray wand 48 carries a distribution device, such as a nozzle 228, at a second end 230.

The fluid pump 220 is mounted on the back side 74 of the hopper 60 and is coupled by a pair of tubes 232 and 233 to the tube connectors 234 for drawing liquid to be dispensed from the tank 222 located within the hopper 60. The fluid pump 220 can be the commercially available type of electrically driven pump that includes a pressure sensor that automatically shuts off the pump in response to a build up in pressure. The fluid pump 220 can be activated by an on/off switch (not shown) on the pump 220 which is operable to connect the fluid pump 220 to the battery 181 for activating the fluid pump. Although the fluid pump is described as being an electrically driven pump, the pump can be a gear driven pump that is driven off of the wheels or off of the spinner shaft to get the fluid pump up to pressure. Alternatively, as a low cost alternative, an insertable hand pump can be used. The hand pump can be pumped by hand from outside of the spreader.

The spray wand 48 can include a switch 236 operable by the user for on/off control of the liquid dispensing function. With the fluid pump 220 activated, upon activating the hose switch 236 to the off condition, the pump pressure sensor will detect the resultant pressure buildup and cause the fluid pump 220 to shut off temporarily. When the switch 236 subsequently is operated to the on condition, the fluid pump 220 is enabled to begin pumping liquid from the tank to the spray wand 48 with the liquid being dispensed by the nozzle 228, over a flow area defined by the flow pattern 238 of the nozzle. The spray wand 48 can be mounted on the side of the hopper 60 when not being use. As is stated above, the hopper spreader/sprayer apparatus 50 preferably includes the set of wheels 44, allowing the hopper spreader/sprayer apparatus 50 to towed by a vehicle or to be moved by the user. It should be noted that features of the hopper spreader/sprayer 50 related to the sprayer apparatus 46, such as pump mount, the fill inlet and fill cap 240 for the liquid tank, for example, although not shown in FIGS. 1-25, preferably would be included in the basic hopper unit 34 that forms the base for the hopper spreader apparatus 30 and the wheeled hopper spreader apparatus 45.

Figure 29:
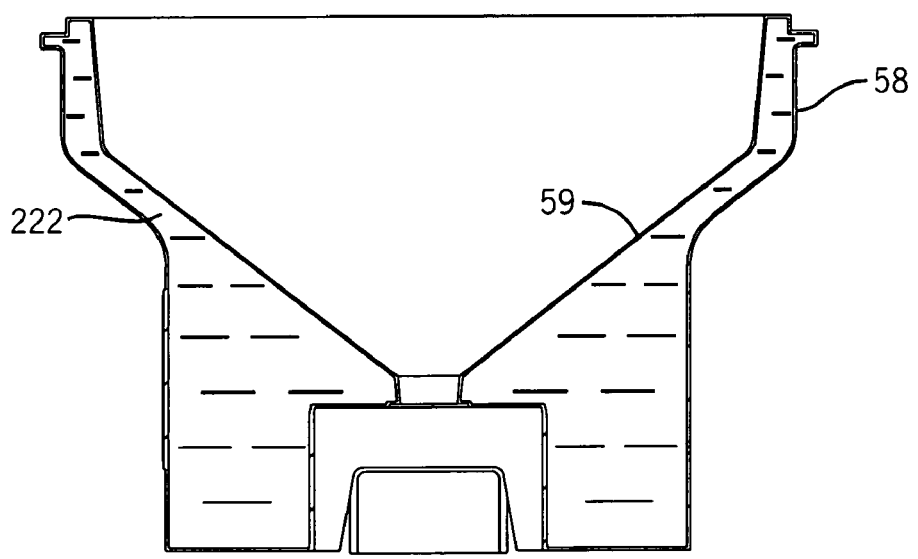
FIG. 29 is a simplified representation of the interior of the hopper illustrating the double wall construction.
Figure 30:
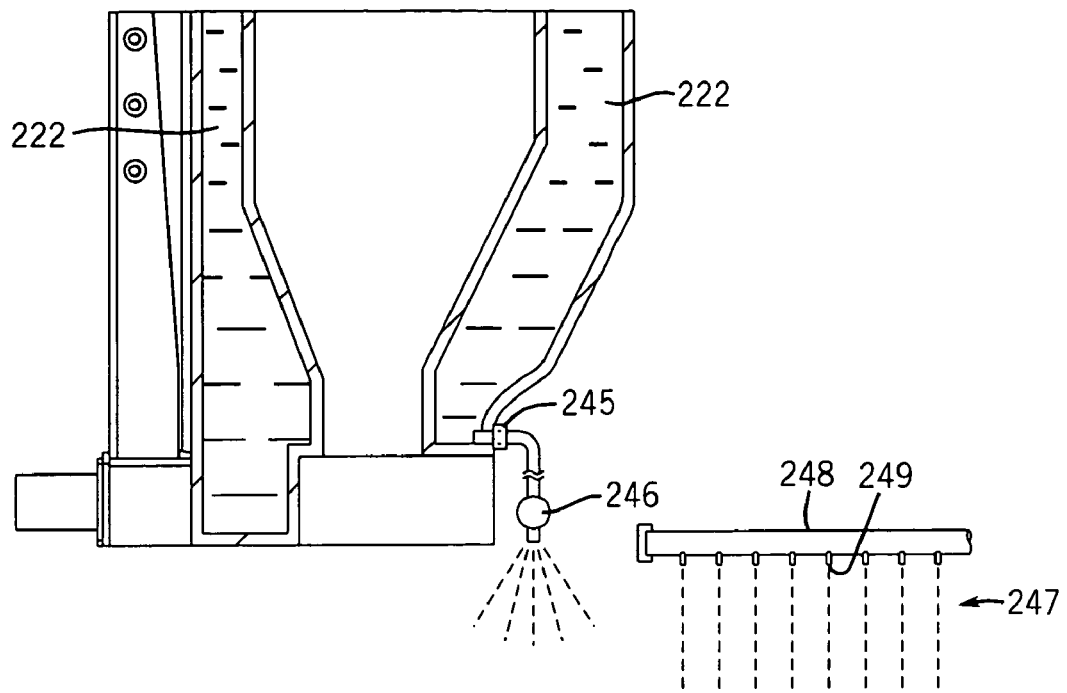
FIG. 30 is a schematic representation showing the use of gravity feed under solenoid control to draw liquid from the liquid tank.
Figure 31:
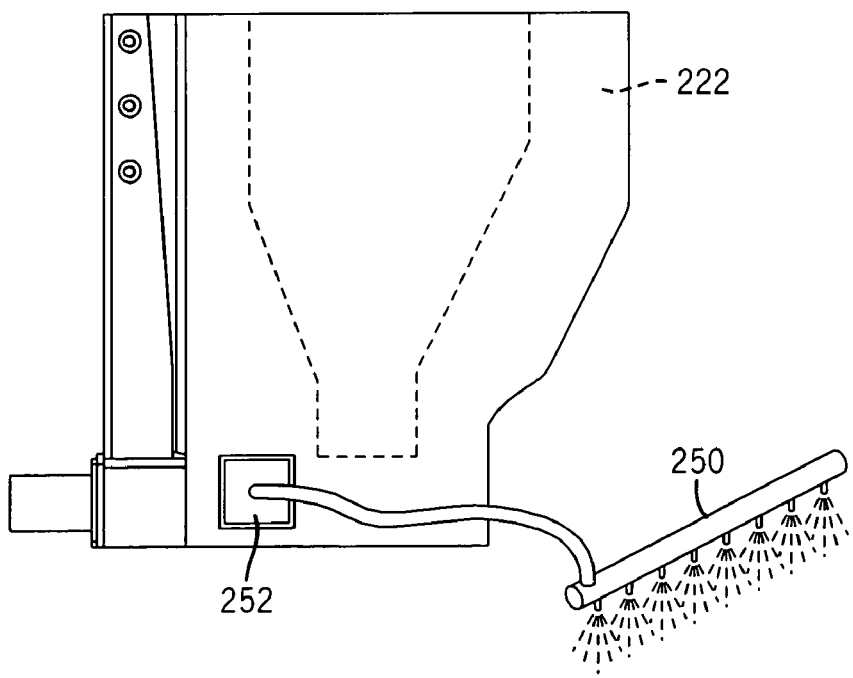
FIG. 31 illustrates the use of a pressurized spray rail as a distribution device for liquid being drawn from the liquid tank.

FIG. 29 is a simplified representation of the interior of the hopper 60 (FIG. 27), illustrating the double wall construction provided by walls 58, 59, that defines a liquid tank 222 for storing liquid material to be dispensed. FIG. 30 is a schematic representation showing the use of gravity feed under solenoid control 245, which functions as the flow to supply liquid from the liquid tank 222 to liquid distribution device, such as a nozzle 246, to be dispensed over a flow area 247 defined by the flow pattern of the nozzle 246. Alternatively, the liquid distribution device can be a flow tube 248, which can be a length of PVC tube with holes or short tubes 249, to be distributed over a linear path. FIG. 31 illustrates use of a pressurized spray rail 250 as a distribution apparatus for liquid being drawn from the liquid tank 222 by an electric pump 252.

Figure 28:
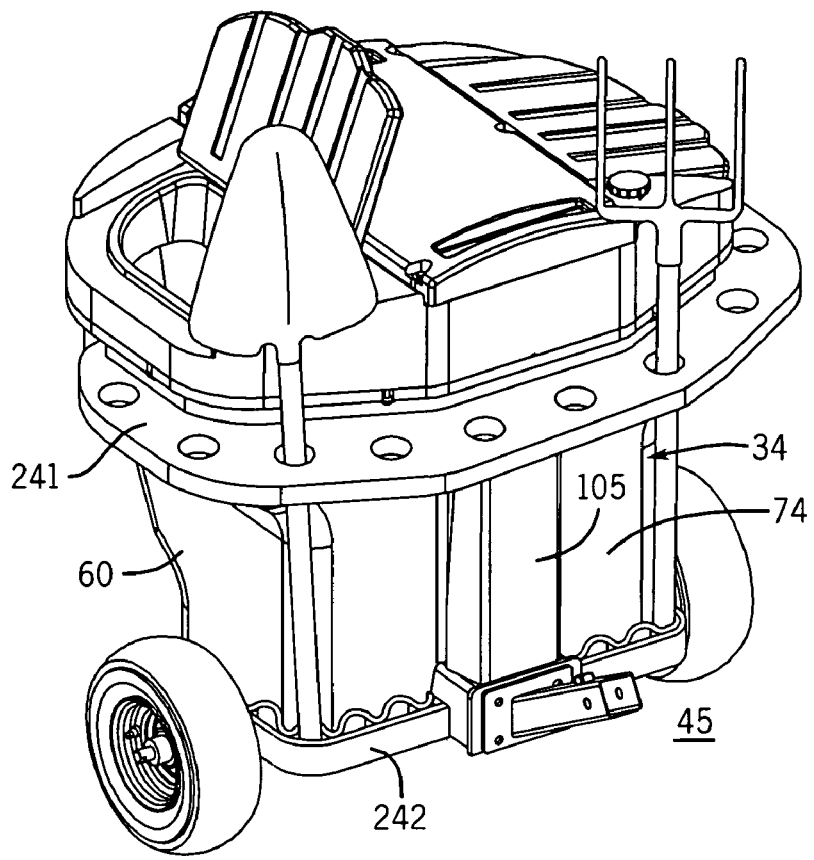
FIG. 28 is a view of a hopper spreader apparatus according the invention and including a tool rack.

FIG. 28 illustrates the hopper spreader/sprayer apparatus 45 as including a tool rack 241 mounted on the rear side 74 of the hopper 60, with a base 242, near the bottom of the hopper 60 for supporting one end of the tool. Such tool rack and base can be included in the hopper spreader/sprayer 50 as well as in the hopper spreader apparatus 30. In addition, the tool rack 241 can include a hanger or the like for holding the spray hose for hopper spreader/sprayer 50 when the spray hose is not in use.

It may therefore be appreciated from the above detailed description of the preferred embodiment of the present invention that it provides a variable discharge mechanism for a hopper spreader apparatus. The variable discharge mechanism allows varying the discharge rate by providing relative rotation between flow gate members to adjust the size of a delivery opening and thus the discharge volume flow rate. In addition, the distribution pattern can be changed by changing the location of the delivery opening with respect to the spinner. This can be done by rotating the flow gate members as a unit, clockwise or counterclockwise, about the axis of the drive shaft 63.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A hopper spreader apparatus, comprising:
   a hopper for containing dry, free flow material to be dispensed, said hopper having a discharge outlet for dispensing the material, said hopper being molded as a unitary structure to include a hollow wall extending around the entire periphery of said hopper, said hollow wall of said hopper providing a liquid storage space for containing within said hollow wall of said hopper a liquid to be dispensed, the liquid storage space extending around the entire periphery of said hopper, and the hollow wall being closed around the periphery of said hopper at the bottom of the hopper to allow liquid to be retained in said liquid storage space;
   a spinner located adjacent to said discharge outlet for receiving free flow material discharged from said hopper and spreading the material over a distribution area;
   a liquid distribution device; and
   a flow control apparatus coupling said liquid distribution device to the liquid storage space, said flow control apparatus operable to allow liquid from said liquid storage space to be dispensed in a spray pattern defined by said liquid distribution device;

a control unit for controlling operating parameters of at least said spinner;

wherein the control unit includes a radio frequency transmitter for transmitting control signals and a radio frequency receiver responsive to the control signals for controlling operating parameters of said spinner.

2. The hopper spreader apparatus according to claim 1, wherein the hopper spreader apparatus is adapted for mounting on a vehicle, the hopper spreader apparatus including an adapter adapted to be received by a trailer hitch of the vehicle.

3. The hopper spreader apparatus according to claim 1, wherein said hopper includes wheels supporting the hopper on a surface being traveled by the vehicle, and a hitch coupler for connecting to a ball hitch of a vehicle to allow the hopper spreader apparatus to be towed by the vehicle.

4. The hopper spreader apparatus according to claim 1, wherein said hopper includes wheels supporting said hopper on a surface, and a handle, allowing the hopper spreader apparatus to be pushed manually along said surface.

5. The hopper spreader apparatus according to claim 1, wherein said hopper includes at least one roller wheel rotatably attached to said hopper to facilitate moving the hopper spreader apparatus along a surface.

6. the hopper spreader apparatus according to claim 1, and further including a variable discharge mechanism interposed between said discharge outlet and said spinner for delivering material to the spinner through a delivery opening.

7. The hopper spreader apparatus according to claim 6, wherein said variable discharge mechanism includes a flow gate assembly defining said delivery opening said flow gate assembly being adjustable to vary at least the size of said delivery opening.

8. The hopper spreader apparatus according to claim 1, wherein said hollow wall of said hopper includes an outer wall and an inner wall, said inner wall of said hopper defining an inner storage chamber for dry free flow material to be dispensed from the hopper, said outer wall of said hopper hollow wall being spaced apart from said inner wall of said hopper hollow wall, providing said hollow space between said outer and inner walls of said hopper hollow wall that defines said liquid storage space, with said inner wall of said hopper being common to said inner storage chamber and said liquid storage space.

9. The hopper spreader apparatus according to claim 1, wherein said liquid distribution device comprises a spray wand including a nozzle, and wherein said flow control apparatus includes a liquid pump interposed between said spray wand and said liquid storage space for supplying liquid from said liquid storage space to said spray wand.

10. The hopper spreader apparatus according to claim 1, wherein said liquid distribution device comprises a liquid distribution tube, and wherein said flow control apparatus includes a flow control device interposed between said liquid distribution tube and said liquid storage tank for supplying liquid from said liquid storage tank to said liquid distribution tube.

11. The hopper spreader apparatus according to claim 1, wherein said liquid distribution device comprises a pressurized spray rail, and wherein said flow control apparatus includes a fluid pump interposed between said pressurized spray rail and said liquid storage tank for supplying liquid under pressure from said liquid storage tank to said pressurized spray rail.

12. The hopper spreader apparatus according to claim 1, wherein said hopper further includes a tool rack for carrying tools.

13. A hopper spreader apparatus for use with a vehicle, said hopper spreader apparatus comprising:

a hopper for containing dry, free flow material to be dispensed, said hopper having a discharge outlet for dispensing the material, said hopper being molded as a unitary structure to include a hollow wall extending around the entire periphery of said hopper, said hollow wall of said hopper providing a liquid storage space for containing within said hollow wall of said hopper a liquid to be dispensed, the liquid storage space extending around the entire periphery of said hopper, and the hollow wall being closed around the periphery of said hopper at the bottom of the hopper to allow liquid to be retained in said liquid storage space;

a spinner located adjacent to said discharge outlet for receiving free flow material discharged from said hopper and spreading the material over a large distribution area;

a coupling mechanism for coupling the hopper to the vehicle;

a liquid distribution device;

a flow control apparatus coupling said liquid distribution device to the liquid storage space, said flow control apparatus operable to allow liquid from said liquid storage space to be dispensed in a spray pattern defined by said liquid distribution device; and a control unit for controlling operating parameters of at least said spinner;

wherein the control unit includes a radio frequency transmitter for transmitting control signals and a radio frequency receiver responsive to the control signals for controlling operating parameters of said spinner.

14. The hopper spreader apparatus according to claim 13, and wherein said coupling mechanism includes a hitch adapter adapted to be received by a trailer hitch of the vehicle for removably mounting the hopper spreader apparatus on the vehicle.

15. The hopper spreader apparatus according to claim 13, wherein said hopper includes wheels supporting said hopper on a surface being traveled by the vehicle, and wherein said coupling mechanism includes a hitch coupler assembly for connecting to a ball hitch on a vehicle to allow the hopper spreader apparatus to be towed by the vehicle.

16. The hopper spreader apparatus according to claim 15, wherein said hitch coupler assembly includes a hitch tube, said hitch coupler assembly adjustable for compensating for a difference in vertical height, relative to said surface, between the location of the ball hitch on the vehicle and said hitch tube.

17. The hopper spreader apparatus according to claim 13, and further including a variable discharge mechanism interposed between said discharge outlet and said spinner for delivering material to the spinner through a delivery opening.

18. The hopper spreader apparatus according to claim 17, wherein said variable discharge mechanism includes a flow gate assembly defining said delivery opening said flow gate assembly being adjustable to vary at least the size of said delivery opening.

19. The hopper spreader apparatus according to claim 13, wherein said hollow wall of said hopper includes an outer wall and an inner wall, said inner wall of said hopper defining an inner storage chamber for dry free flow material to be dispensed from the hopper, said outer wall of said hopper hollow wall being spaced apart from said inner wall of said hopper hollow wall, providing a hollow space between said outer and inner walls of said hopper hollow wall that defines said liquid storage space, with said inner wall of said hopper being common to said inner storage chamber and said liquid storage space.

20. The hopper spreader apparatus according to claim 13, wherein said liquid distribution device comprises a spray wand including a nozzle, and wherein said flow control apparatus includes a liquid pump interposed between said spray wand and said liquid storage space for supplying liquid from said liquid storage space to said spray wand.

21. The hopper spreader apparatus according to claim 13, wherein said liquid distribution device comprises a liquid distribution tube, and wherein said flow control apparatus includes a flow control device interposed between said liquid distribution tube and said liquid storage tank for supplying liquid from said liquid storage tank to said liquid distribution tube.

22. The hopper spreader apparatus according to claim 13, wherein said liquid distribution device comprises a pressurized spray rail, and wherein said flow control apparatus includes a fluid pump interposed between said pressurized spray rail and said liquid storage tank for supplying liquid under pressure from said liquid storage tank to said pressurized spray rail.

23. A portable hopper spreader apparatus adapted to be pushed by hand by a user, said hopper spreader apparatus comprising:
   a hopper for containing dry, free flow material to be dispensed, said hopper having a discharge outlet for dispensing the material, said hopper being made of a rigid plastic material and being molded as a unitary structure to include a hollow wall defined by inner and outer walls of said hopper extending around the entire periphery of said hopper, said inner and outer walls of said hopper hollow wall being molded to be spaced apart from one another to provide a hollow space between said outer wall of said hopper and said inner wall of said hopper, said hollow wall of said hopper providing a liquid storage space for containing within said hollow wall of said hopper a liquid to be dispensed, the liquid storage space extending around the entire periphery of said hopper, and the hollow wall being closed around the periphery of said hopper at the bottom of the hopper to allow liquid to be retained in said liquid storage space;
   a spinner located adjacent to said discharge outlet for receiving free flow material discharged from said hopper and spreading the material over a large distribution area;
   a liquid distribution device;
   a flow control apparatus coupling said liquid distribution device to the liquid storage space, said flow control apparatus operable to allow liquid from said liquid storage space to be dispensed in a spray pattern defined by said liquid distribution device; and
   a set of wheels mounted on the bottom on the hopper for supporting the hopper spreader apparatus on a surface, allowing the hopper spreader apparatus to be pushed manually along said surface by a user.

24. The hopper spreader apparatus according to claim 23, wherein said hopper includes a handle to facilitate pushing of the hopper spreader apparatus by a user.

25. The hopper spreader apparatus according to claim 23, wherein said liquid distribution device comprises a spray wand including a nozzle, and wherein said flow control apparatus includes a liquid pump interposed between said spray wand and said liquid storage space for supplying liquid from said liquid storage space to said spray wand.

26. The hopper spreader apparatus according to claim 23, wherein said liquid distribution device comprises a liquid distribution tube, and wherein said flow control apparatus includes a flow control device interposed between said liquid distribution tube and said liquid storage tank for supplying liquid from said liquid storage tank to said liquid distribution tube.

27. The hopper spreader apparatus according to claim 23, wherein said liquid distribution device comprises a pressurized spray rail, and wherein said flow control apparatus includes a fluid pump interposed between said pressurized spray rail and said liquid storage tank for supplying liquid under pressure from said liquid storage tank to said pressurized spray rail.

28. A combined hopper spreader/sprayer apparatus for dispensing dry, free flow material and liquid material, said hopper spreader/sprayer apparatus comprising:
   a hopper spreader apparatus including
      a hopper for containing the dry, free flow material to be dispensed, said hopper having a discharge outlet for dispensing the material, said hopper being molded as a unitary structure to include a hollow wall extending around the entire periphery of said hopper, said inner and outer walls of said hopper being molded to be spaced apart from one another to provide a hollow space between said outer wall of said hopper and said inner wall of said hopper, said hollow wall of said hopper providing a liquid storage space for containing within said hollow wall of said hopper a liquid to be dispensed, the liquid storage space extending around the entire periphery of said hopper, and the hollow wall being closed around the periphery of said hopper at the bottom of the hopper to allow liquid to be retained in said liquid storage space,
      the hopper further including a hitch adapter receivable by a hitch of a vehicle, allowing the hopper spreader apparatus to be towed by the vehicle or to be mounted directly on and carried by the vehicle;
      a spinner located adjacent to said discharge outlet for receiving free flow material discharged from said hopper and spreading the material over a large distribution area; and
      a discharge mechanism interposed between said discharge outlet and said spinner;
   a sprayer apparatus including
      a liquid distribution device,
      a flow control apparatus coupling said liquid distribution device to the liquid storage space, said flow control apparatus operable to allow liquid from the liquid storage space to be dispensed in a spray pattern defined by said liquid distribution device; and
   a wheel assembly including
      a set of wheels and mounting members removably installing said set of wheels on said hopper for supporting the hopper spreader apparatus on a surface, allowing the hopper spreader/sprayer apparatus to be towed by the vehicle or pushed manually along said surface when said set of wheels is installed on said hopper, said mounting members allowing said set of wheels to be removed from said hopper to allow the hopper spreader apparatus to be directly mounted on and carried by the vehicle.

* * * * *